US012694129B1

(12) United States Patent
White

(10) Patent No.: US 12,694,129 B1
(45) Date of Patent: Jul. 28, 2026

(54) SYSTEMS AND METHODS AI-DRIVEN SECURITY REQUIREMENTS GENERATION AND ENFORCEMENT ACROSS SOFTWARE DEVELOPMENT AND IT MANAGEMENT SYSTEMS

(71) Applicant: Truist Bank, Charlotte, NC (US)

(72) Inventor: Brian Matthew White, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 19/382,420

(22) Filed: Nov. 7, 2025

(51) Int. Cl.
*G06F 8/10* (2018.01)
*G06F 8/60* (2018.01)
(Continued)

(52) U.S. Cl.
CPC .............. *G06F 21/577* (2013.01); *G06F 8/10* (2013.01); *G06F 8/60* (2013.01); *G06F 8/70* (2013.01);
(Continued)

(58) Field of Classification Search
CPC .... G06F 21/577; G06F 2221/033; G06F 8/60; G06F 21/54; G06F 2212/1052; G06F 21/57; G06F 8/10; G06F 8/00
See application file for complete search history.

(56) References Cited

U.S. PATENT DOCUMENTS 9,405,523 B2 * 8/2016 Choi .......................... G06F 8/20
2014/0026131 A1 * 1/2014 Ravi .......................... G06F 8/60
717/177

(Continued)

FOREIGN PATENT DOCUMENTS

CN       121029142 A   *  11/2025  ............ G06F 11/079
WO    WO-2019083667 A1 *  5/2019  ............... G06F 8/60

OTHER PUBLICATIONS

Constante, Fabiola Moyón et al. "Integration of Security Standards in DevOps Pipelines: An Industry Case Study", 2021-05-27, obtained online from <https://arxiv.org/pdf/2105.13024>, retrieved on Jan. 9, 2026. (Year: 2021).*

(Continued)

*Primary Examiner* — Zhimei Zhu
(74) *Attorney, Agent, or Firm* — Jordan IP Law LLC; Michael A. Springs, Esq.

(57) ABSTRACT

A method, computer program product, and computer system for receiving, by a computing system, application development data describing at least one software component to be developed. An artificial intelligence (AI) model trained with industry-standard security frameworks and organization-specific security policies may identify a plurality of security requirements corresponding to the application development data. A requirements report identifying the plurality of security requirements may be generated. A development backlog may be populated based upon, at least in part, the requirements report. Automated build events of the software component may be monitored in a continuous-integration/continuous-deployment (CI/CD) pipeline. Compliance of the software component may be verified with one or more of the plurality of security requirements based on the automated build events. A record for the software component may be updated to indicate a compliance status. Deployment of the software component may be controlled to a production environment based on the compliance status.

19 Claims, 8 Drawing Sheets

(51) Int. Cl.
  *G06F 8/70* (2018.01)
  *G06F 21/57* (2013.01)
(52) U.S. Cl.
  CPC .. *G06F 2221/033* (2013.01); *G06F 2221/034* (2013.01)

(56) References Cited

U.S. PATENT DOCUMENTS

| | | | | |
|---|---|---|---|---|
| 2022/0283802 | A1* | 9/2022 | Bhalla | G06N 5/02 |
| 2023/0195455 | A1* | 6/2023 | Pugh | G06F 8/77 |
| | | | | 717/102 |
| 2024/0028302 | A1* | 1/2024 | Maciver | G06F 8/10 |
| 2024/0086190 | A1* | 3/2024 | Kwatra | G06F 21/577 |

OTHER PUBLICATIONS

B. Radenkovic et al. "Application of Large Language Models in Software Development: Review of the Current State and Development Perspectives," 2025 6th International Workshop on Engineering Technologies and Computer Science (EnT), Sankt Peterburg, Russian Federation, Oct. 29-29, 2025, pp. 1-7 (Year: 2025).*

David de-Fitero-Dominguez, Eva Garcia-Lopez, Antonio Garcia-Cabot, Jose-Javier Martinez-Herraiz, "Enhanced automated code vulnerability repair using large language models", Dec. 2024, Engineering Applications of Artificial Intelligence, vol. 138, Part A ( Year: 2024).*

Jessica Ji et al., Cybersecurity Risks of AI-Generated Code, Nov. 2024, obtained from <https://cset.georgetown.edu/wp-content/uploads/CSET-Cybersecurity-Risks-of-AI-Generated-Code.pdf#:~:text= Advancements%20in%20artificial%20intelligence%20have,While% 20improvements%20in%20large%20language> (Year: 2024).*

Joseph M. Saunders, AI Is Writing the Next Wave of Software Vulnerabilities—Are We "Vibe Coding" Our Way to a Cyber Crisis?, Oct. 15, 2025, obtained online from <https://runsafesecurity. com/blog/ai-generated-code-memory-protection/>, retrieved on May 8, 2026. (Year: 2025).*

Derek Derui Wang, Security Pitfalls of AI Code Generation Tools— 2025 Update, Jul. 2025, obtained online from <https://medium.com/ @derekdw/security-pitfalls-of-ai-code-generation-tools-2025-update-8ded7e50244d>, retrieved on May 8, 2026. (Year: 2025).*

* cited by examiner

500

Requirements

Per your responses, your project/application/service requires:

- Automated Compliance Testing and Governance

- Network Security Control Plane

- Privilege Usage Management (PAM, UMS)

- Identity Lifecycle Management

Automated Compliance Testing and Governance:

This includes Cloud Workload Protection Platform (CWPP) scanning and automated remediation, Cloud Access Security Broker (CASB) functionality, posture assessment, vulnerability & patch management, as well as VMDP compliance validation.

Network Security Control Plane:

Layer 3–7 Inspection, encryption interception, network Intrusion Prevention System (IPS) / Intrusion Detection System (IDS), logging/data collection by use case, Virtual Private Network (VPN) termination, port/protocol/ service/IP filtering Firewall (typically stateful), and Distributed Denial of Service (DDoS). Does not include Data Loss Prevention (DLP) and anti-malware as these are part of other core capabilities.

Privilege Usage Management (PAM, UMS):

Includes both Privilege Account Management (PAM) and Privileged Usage Gateway (PUG).

Identity Lifecycle Management:

The process to create, manage, remove, and govern identities for access to business tools and information.

Approve

Disapprove

View GSB

138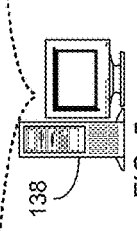

CERTIFICATION REPORT

Scanning Vendor:
Security-Development Standard:
Timestamp:
Digital Signature:

SANITIZED SCAN RESULTS

Vulnerability Summary

| Category | Severity | Remediation |
|---|---|---|
| Authentication Flaws | Medium | Remediated |
| Injection Risks | High | Remediated |
| Cryptographic Weaknesses | Low | Remediated |

• • •

Detailed Findings

| File Path | Line | Rule Violated | Severity | Remediation Notes |
|---|---|---|---|---|
| [REDACTED].py | 42 | | Medium | Fixed authentication issue |
| [REDACTED].js | 108 | | High | input validation implemented |
| [REDACTED].yaml | 15 | | Low | Correction applied |

• • •

Final Status

| PASS | |
|---|---|
| | Compliance Score: 100/100 |
| | Compliance Rating: Excellent |

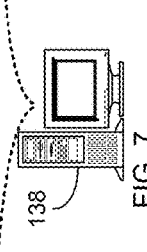

SYSTEMS AND METHODS AI-DRIVEN SECURITY REQUIREMENTS GENERATION AND ENFORCEMENT ACROSS SOFTWARE DEVELOPMENT AND IT MANAGEMENT SYSTEMS

TECHNICAL FIELD

The present disclosure relates generally to software security management, and more particularly to systems and methods for automatically generating, enforcing, and validating application security requirements using artificial intelligence (AI) models that integrate with continuous-integration/continuous-deployment (CI/CD) pipelines and information-technology service-management (ITSM) platforms.

BACKGROUND

Organizations increasingly rely on software developed by third-party vendors, open-Modern organizations increasingly rely on rapid software development pipelines that incorporate code from diverse internal teams, third-party vendors, and open-source repositories. While such agile and decentralized development accelerates innovation, it also increases the likelihood that security requirements are inconsistently defined or incompletely implemented. In particular, developers are often unaware of the precise set of security controls applicable to a given technology stack, data classification, or hosting environment, resulting in code that fails to comply with recognized frameworks such as the National Institute of Standards and Technology (NIST) Secure Software Development Framework (SSDF), the Open Worldwide Application Security Project (OWASP) Top Ten, or internal enterprise security policies.

SUMMARY

In one example implementation, a computer-implemented method, performed by one or more computing devices, may include but is not limited to receiving, by a computing system, application development data describing at least one software component to be developed. An artificial intelligence (AI) model trained with industry-standard security frameworks and organization-specific security policies may identify a plurality of security requirements corresponding to the application development data. A requirements report identifying the plurality of security requirements may be generated. A development backlog may be populated based upon, at least in part, the requirements report. Automated build events of the software component may be monitored in a continuous-integration/continuous-deployment (CI/CD) pipeline. Compliance of the software component may be verified with one or more of the plurality of security requirements based on the automated build events. A record for the software component may be updated to indicate a compliance status. Deployment of the software component may be controlled to a production environment based on the compliance status.

One or more of the following example features may be included. The AI model may be trained using non-functional security requirements from at least one of NIST, PCI-DSS, ISO-27001, and OWASP, in combination with internal organizational standards. Receiving the application development data may include ingesting a design artifact describing an intended functionality of the software component. The AI model may perform natural-language processing to extract contextual indicators of technology stack, hosting environment, and data classification to determine relevant security controls. The plurality of security requirements may be associated with a corresponding unique application identifier. Verifying compliance may include receiving telemetry from security tools in the CI/CD pipeline and comparing the telemetry against the identified security requirements. The compliance status may be represented using a color-coded indicator comprising a red, yellow, or green state. The AI model may be updated based on at least one of observed production vulnerabilities and incident data to continuously refine future security requirement generation. Non-compliant security requirements may be transmitted to a change-management workflow to trigger additional manual review before deployment. A digital certification report may be generated confirming compliance of the software component with the plurality of security requirements, wherein the certification report may be digitally signed to authenticate origin and integrity. The certification report may be stored in an immutable ledger to evidence compliance of the software component with a predefined security profile. An operational risk score for the software component may be updated based on the compliance status. A speed-lane deployment control may be enforced based on whether the compliance status transitions to a red, a yellow, or a green state. The AI model may generate a threat model predicting potential attack vectors based on the application development data. The threat model may be updated dynamically using real-time cyber-threat intelligence feeds to modify a risk ranking of the software component. The requirements report may be formatted for integration with project-management tools to facilitate resource planning and timeline estimation. A configuration of the CI/CD pipeline may be automatically updated to include enforcement scripts for the plurality of security requirements. The AI model may be deployed as a third-party certification service accessible to multiple independent software vendors and configured to enforce generation of security-requirement reports prior to production deployment.

In another example implementation, a computing system may include one or more processors and one or more memories configured to perform operations that may include but are not limited to receiving, by a computing system, application development data describing at least one software component to be developed. An artificial intelligence (AI) model trained with industry-standard security frameworks and organization-specific security policies may identify a plurality of security requirements corresponding to the application development data. A requirements report identifying the plurality of security requirements may be generated. A development backlog may be populated based upon, at least in part, the requirements report. Automated build events of the software component may be monitored in a continuous-integration/continuous-deployment (CI/CD) pipeline. Compliance of the software component may be verified with one or more of the plurality of security requirements based on the automated build events. A record for the software component may be updated to indicate a compliance status. Deployment of the software component may be controlled to a production environment based on the compliance status.

One or more of the following example features may be included. The AI model may be trained using non-functional security requirements from at least one of NIST, PCI-DSS, ISO-27001, and OWASP, in combination with internal organizational standards. Receiving the application development data may include ingesting a design artifact describing an intended functionality of the software component. The AI model may perform natural-language processing to extract contextual indicators of technology stack, hosting environment, and data classification to determine relevant security controls. The plurality of security requirements may be associated with a corresponding unique application identifier. Verifying compliance may include receiving telemetry from security tools in the CI/CD pipeline and comparing the telemetry against the identified security requirements. The compliance status may be represented using a color-coded indicator comprising a red, yellow, or green state. The AI model may be updated based on at least one of observed production vulnerabilities and incident data to continuously refine future security requirement generation. Non-compliant security requirements may be transmitted to a change-management workflow to trigger additional manual review before deployment. A digital certification report may be generated confirming compliance of the software component with the plurality of security requirements, wherein the certification report may be digitally signed to authenticate origin and integrity. The certification report may be stored in an immutable ledger to evidence compliance of the software component with a predefined security profile. An operational risk score for the software component may be updated based on the compliance status. A speed-lane deployment control may be enforced based on whether the compliance status transitions to a red, a yellow, or a green state. The AI model may generate a threat model predicting potential attack vectors based on the application development data. The threat model may be updated dynamically using real-time cyber-threat intelligence feeds to modify a risk ranking of the software component. The requirements report may be formatted for integration with project-management tools to facilitate resource planning and timeline estimation. A configuration of the CI/CD pipeline may be automatically updated to include enforcement scripts for the plurality of security requirements. The AI model may be deployed as a third-party certification service accessible to multiple independent software vendors and configured to enforce generation of security-requirement reports prior to production deployment.

In another example implementation, a computer program product may reside on a computer readable storage medium having a plurality of instructions stored thereon which, when executed across one or more processors, may cause at least a portion of the one or more processors to perform operations that may include but are not limited to receiving, by a computing system, application development data describing at least one software component to be developed. An artificial intelligence (AI) model trained with industry-standard security frameworks and organization-specific security policies may identify a plurality of security requirements corresponding to the application development data. A requirements report identifying the plurality of security requirements may be generated. A development backlog may be populated based upon, at least in part, the requirements report. Automated build events of the software component may be monitored in a continuous-integration/continuous-deployment (CI/CD) pipeline. Compliance of the software component may be verified with one or more of the plurality of security requirements based on the automated build events. A record for the software component may be updated to indicate a compliance status. Deployment of the software component may be controlled to a production environment based on the compliance status.

One or more of the following example features may be included. The AI model may be trained using non-functional security requirements from at least one of NIST, PCI-DSS, ISO-27001, and OWASP, in combination with internal organizational standards. Receiving the application development data may include ingesting a design artifact describing an intended functionality of the software component. The AI model may perform natural-language processing to extract contextual indicators of technology stack, hosting environment, and data classification to determine relevant security controls. The plurality of security requirements may be associated with a corresponding unique application identifier. Verifying compliance may include receiving telemetry from security tools in the CI/CD pipeline and comparing the telemetry against the identified security requirements. The compliance status may be represented using a color-coded indicator comprising a red, yellow, or green state. The AI model may be updated based on at least one of observed production vulnerabilities and incident data to continuously refine future security requirement generation. Non-compliant security requirements may be transmitted to a change-management workflow to trigger additional manual review before deployment. A digital certification report may be generated confirming compliance of the software component with the plurality of security requirements, wherein the certification report may be digitally signed to authenticate origin and integrity. The certification report may be stored in an immutable ledger to evidence compliance of the software component with a predefined security profile. An operational risk score for the software component may be updated based on the compliance status. A speed-lane deployment control may be enforced based on whether the compliance status transitions to a red, a yellow, or a green state. The AI model may generate a threat model predicting potential attack vectors based on the application development data. The threat model may be updated dynamically using real-time cyber-threat intelligence feeds to modify a risk ranking of the software component. The requirements report may be formatted for integration with project-management tools to facilitate resource planning and timeline estimation. A configuration of the CI/CD pipeline may be automatically updated to include enforcement scripts for the plurality of security requirements. The AI model may be deployed as a third-party certification service accessible to multiple independent software vendors and configured to enforce generation of security-requirement reports prior to production deployment.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DRAWINGS

Figure 4:
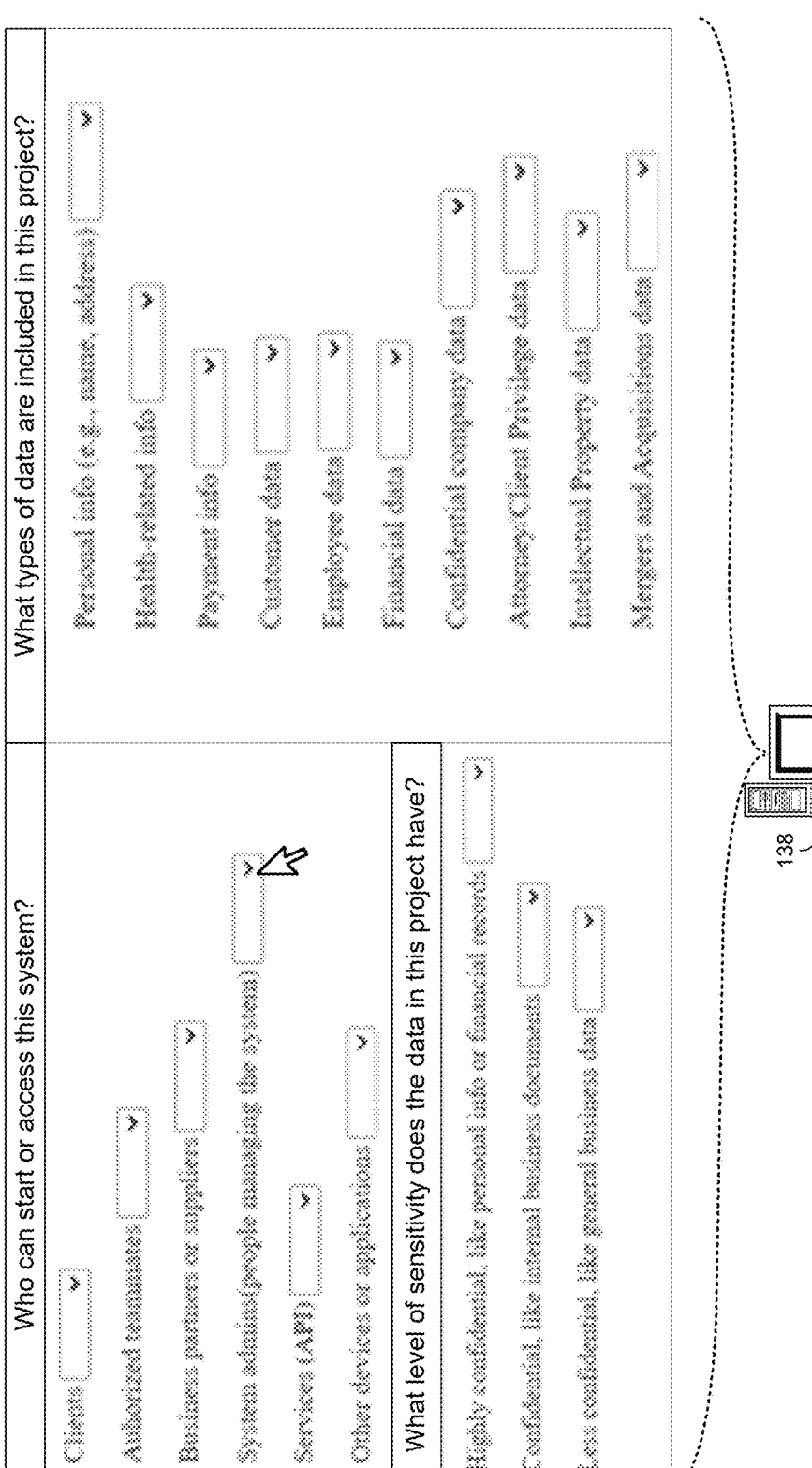
Figure 6:
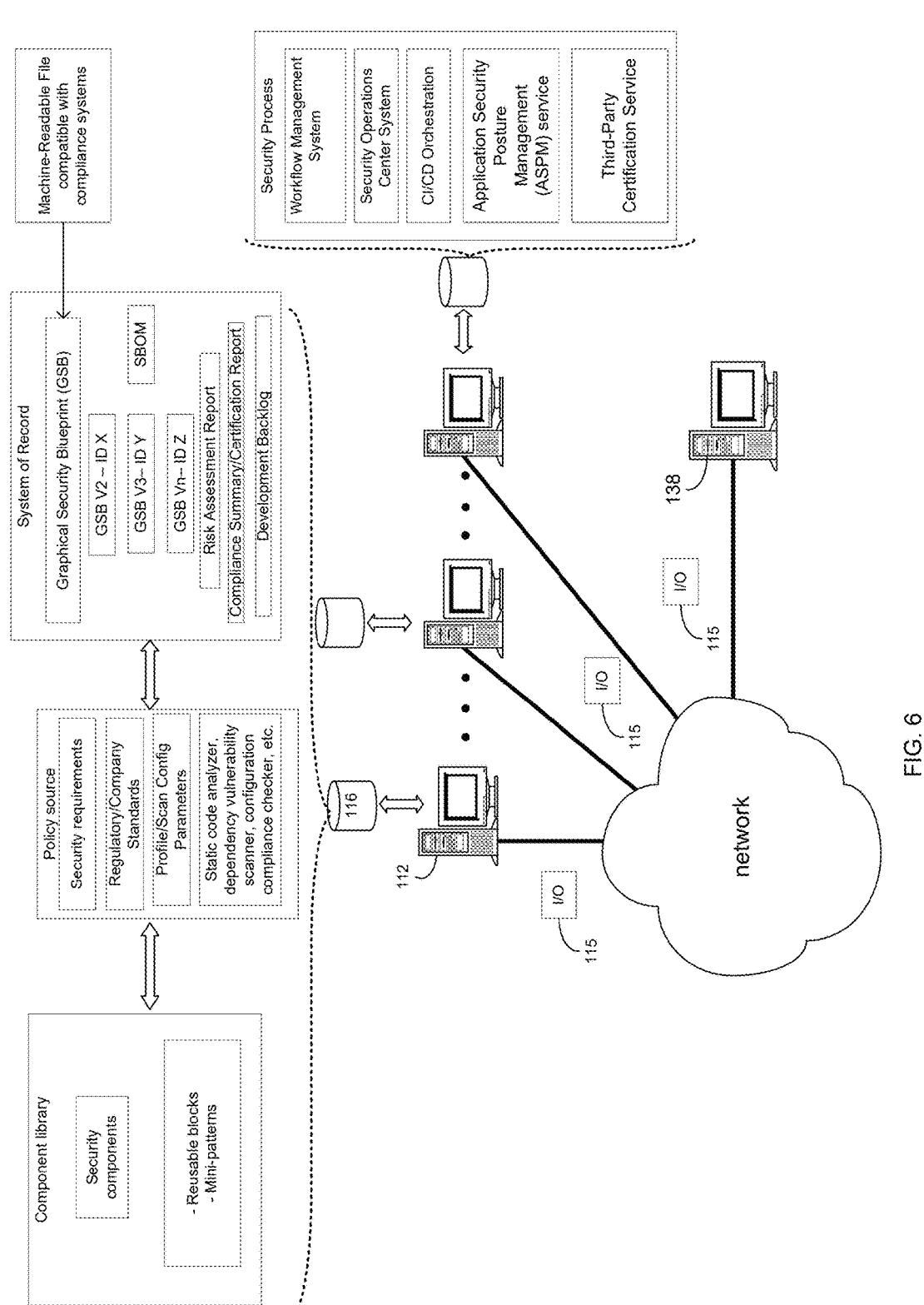
Figure 8:
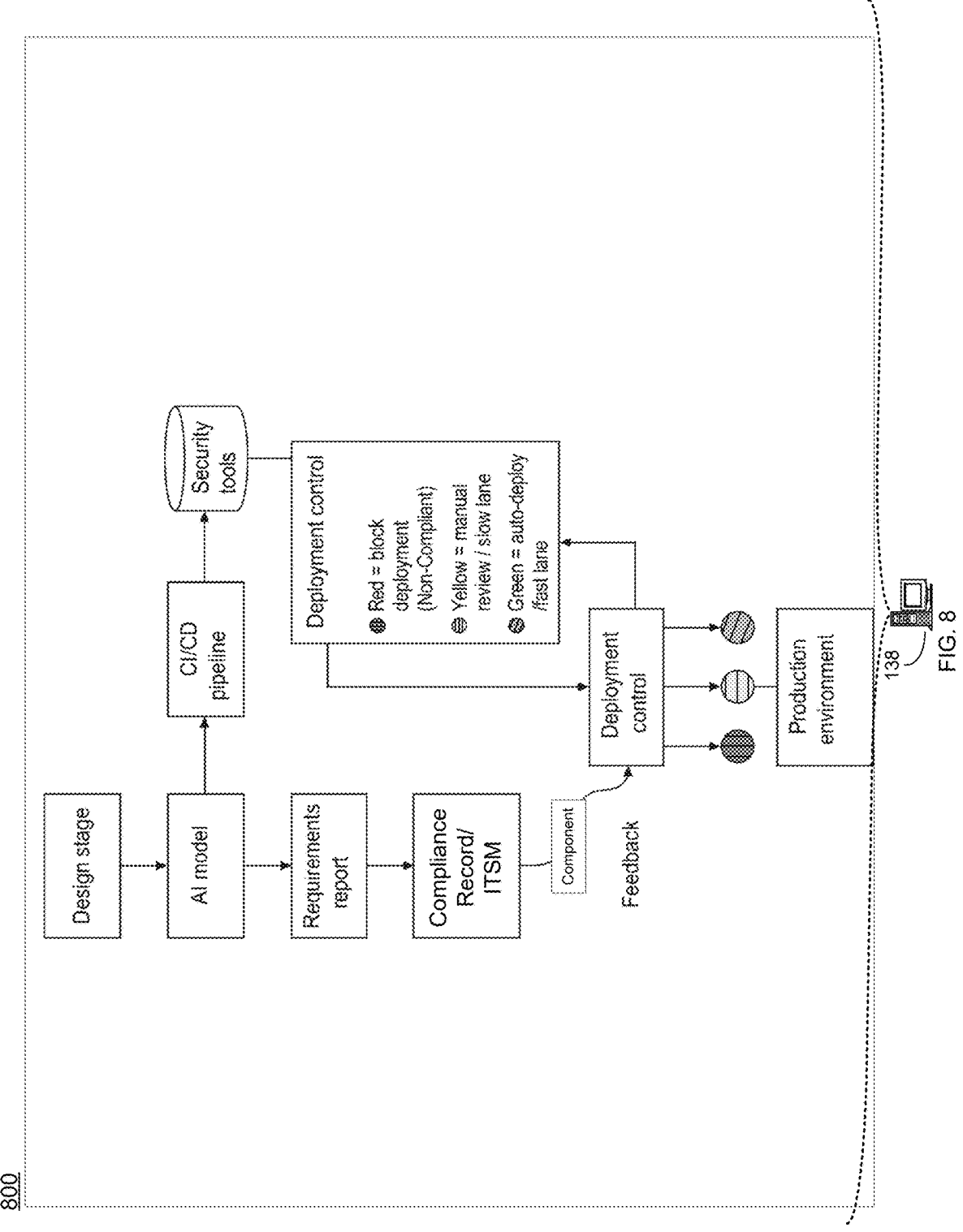

FIG. 4 is an example diagrammatic view of a screen image displayed by a security process according to one or more example implementations of the disclosure;

FIG. 5 is an example diagrammatic view of a screen image displayed by a security process according to one or more example implementations of the disclosure;

FIG. 6 is an example alternative diagrammatic view of an operating environment used by a security process according to one or more example implementations of the disclosure;

FIG. 7 is an example diagrammatic view of a screen image displayed by a security process according to one or more example implementations of the disclosure; and FIG. 8 is an example diagrammatic view of a deployment-control framework used by a security process to dynamically manages the release of software components based on continuously updated compliance status information according to one or more example implementations of the disclosure.

Like reference symbols in the various drawings indicate like elements.

DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

Software may include artificial intelligence (AI) systems, which may include machine learning or other computational intelligence. For example, AI may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

In some implementations, the various computing devices may include, integrate with, link to, exchange data with, be governed by, take inputs from, and/or provide outputs to one or more AI systems, which may include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types may be used, including any of the types described herein, and in embodiments a hybrid set of neural networks may be selected such that within the set a neural network type that is more favorable for performing each element of a multi-function or multi-capability system or method is implemented. As one example among many, a deep learning, or black box, system may use a gated recurrent neural network for a function like language translation for an intelligent agent, where the underlying mechanisms of AI operation need not be understood as long as outcomes are favorably perceived by users, while a more transparent model or system and a simpler neural network may be used for a system for automated governance, where a greater understanding of how inputs are translated to outputs may be needed to comply with regulations or policies.

Examples of the models (e.g., AI-based models) include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model (or other type of AI-based learning models) may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), including natural language understanding (NLU), computer vision (CV), classification, image recognition, etc. Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc. Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

In some implementations, as noted above, AI-based learning models may include at least one of a transformer model, a convolutional neural network, a deep learning model trained on a set of outcomes of the value chain network entity, a supervised model, a semi-supervised model, an unsupervised model, or a reinforcement model, and the training data set for the AI-based learning models may include one or a set of objects or events that are labeled to classify the set of objects or events according to a classification taxonomy. Other examples of AI-based learning models (e.g., machine learning models) may include neural networks in general (e.g., deep neural networks, convolution neural networks, and many others), regression-based models, decision trees, hidden forests, Hidden Markov models, Bayesian models, and the like. In some implementations, the present disclosure may include combinations where an expert system uses one neural network for classifying an item and a different (or the same) neural network for predicting a state of the item.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electro-magnetic, infrared, or semiconductor system, apparatus, device, or any suitable combination of the foregoing. More specific examples (a non-exhaustive list) of the computer-readable medium or storage device may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, solid state drives (SSDs), a digital versatile disk (DVD), a Blu-ray disc, and an Ultra HD Blu-ray disc, a static random access memory (SRAM), dynamic RAM (DRAM), synchronous DRAM (SDRAM), synchronous graphics RAM (SGRAM), and video RAM (VRAM), analog magnetic tape, digital magnetic tape, rotating hard disk drive (HDDs), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, state information that personalizes electronic circuitry and/or other structural components that are native to hardware (e.g., host processor, central processing unit/CPU, microcontroller, etc.) or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a network, such as a cellular network, local area network (LAN), a wide area network (WAN), a body area network BAN), a personal area network (PAN), a metropolitan area network (MAN), etc., or the connection may be made to an external computer (for example, through the internet using an Internet Service Provider). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs), etc. In some implementations, electronic circuitry including, for example, programmable logic circuitry, an application specific integrated circuit (ASIC), gate arrays such as field-programmable gate arrays (FPGAs) or other hardware accelerators, micro-controller units (MCUs), or programmable logic arrays (PLAs), integrated circuits (ICs), digital circuit elements, analog circuit elements, combinational logic circuits, digital signal processors (DSPs), complex programmable logic devices (CPLDs), memory chips, network chips, systems on chip (SoCs), SSD/NAND controller ASICs, and the like, etc. may execute the computer readable program instructions/code by utilizing state information of the computer readable program instructions to personalize the electronic circuitry, in order to perform aspects of the present disclosure. Configurable or fixed-functionality logic may be implemented with complementary metal oxide semiconductor (CMOS) logic circuits, transistor-transistor logic (TTL) logic circuits, or other circuits. Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an AI system-on-chip, a video processing system-on-chip, an organ-on-chip, a quantum algorithm system-on-chip, etc.

Examples of processing hardware may include, e.g., a central processing unit (CPU), a graphics processing unit (GPU), an accelerator (e.g., an AI accelerator), an approximate computing processor, a quantum computing processor, a parallel computing processor, a neural network processor, a signal processor, a digital processor, an analog processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an AI co-processor.

In some implementations, the AI accelerator may include suitable logic, circuitry, and/or interfaces to accelerate artificial intelligence applications, such as, e.g., artificial neural networks, machine vision and machine learning applications, including through parallel processing techniques. In one or more examples, the AI accelerator may include hardware logic or devices such as, e.g., a GPU or an FPGA. The AI accelerator may be used with any of the devices, components, features or methods described herein.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved. In addition, in some of the drawings, signal conductor lines may be represented with lines. Some may be different, to indicate more constituent signal paths, have a number label, to indicate a number of constituent signal paths, and/or have arrows at one or more ends, to indicate primary information flow direction(s). This, however, should not be construed in a limiting manner. Rather, such added detail may be used in connection with one or more implementations to facilitate ease of understanding. Any represented lines, whether or not having additional information, may actually comprise one or more signals/information that may travel in multiple directions and may be implemented with any suitable type of signal scheme, e.g., digital or analog lines implemented with differential pairs, optical fiber lines, and/or single-ended lines, etc.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
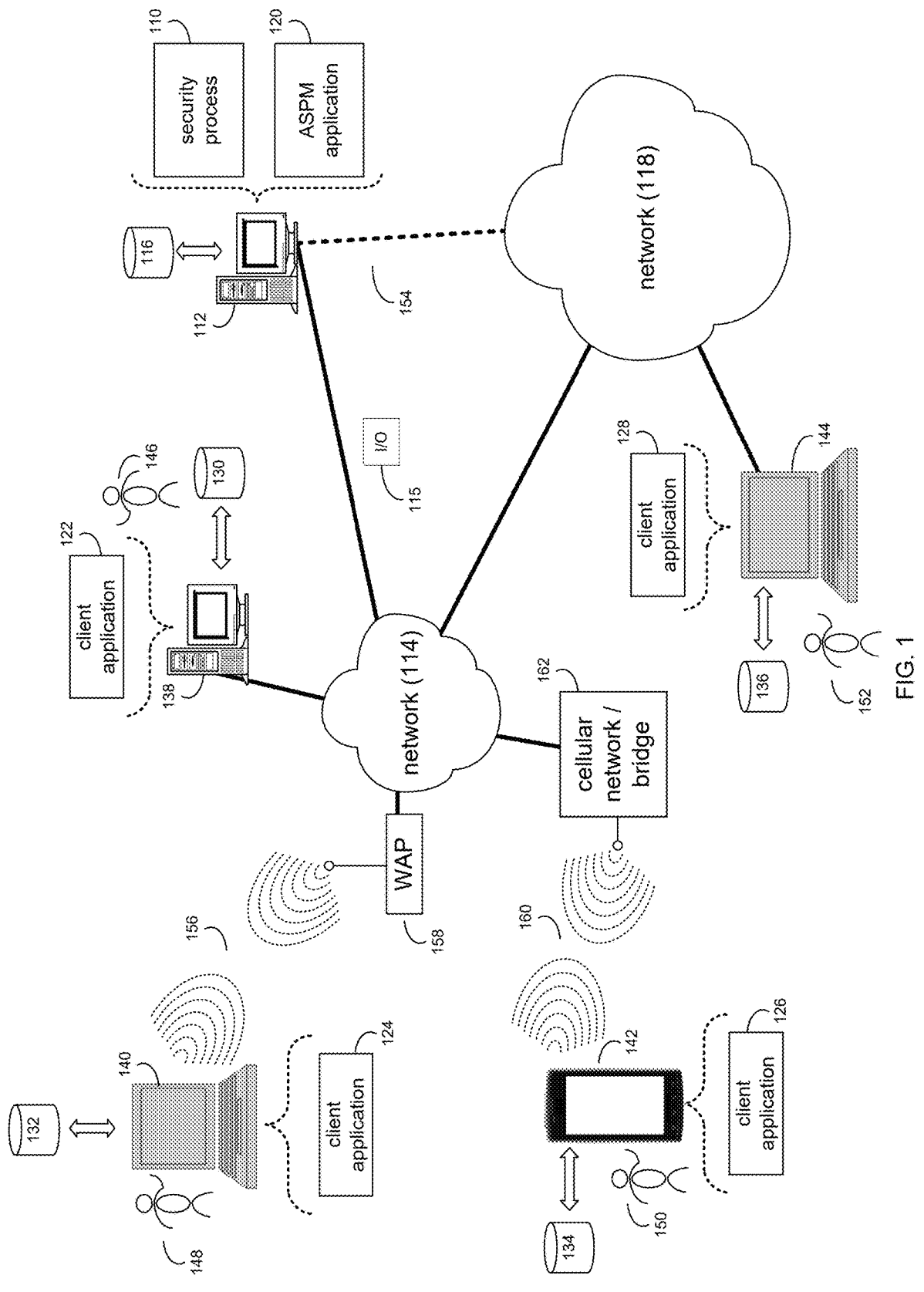
FIG. 1 is an example diagrammatic view of a security process coupled to an example distributed computing network according to one or more example implementations of the disclosure.

Referring now to the example implementation of FIG. 1, there is shown security process 110 that may reside on and may be executed by a computer (e.g., computer 112), which may be connected to a network (e.g., network 114) (e.g., the internet or a local area network). Examples of computer 112 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a security process, such as security process 110 of FIG. 1, may receive, by a computing system, application development data describing at least one software component to be developed. An artificial intelligence (AI)

model trained with industry-standard security frameworks and organization-specific security policies may identify a plurality of security requirements corresponding to the application development data. A requirements report identifying the plurality of security requirements may be generated. A development backlog may be populated based upon, at least in part, the requirements report. Automated build events of the software component may be monitored in a continuous-integration/continuous-deployment (CI/CD) pipeline. Compliance of the software component may be verified with one or more of the plurality of security requirements based on the automated build events. A record for the software component may be updated to indicate a compliance status. Deployment of the software component may be controlled to a production environment based on the compliance status.

In some implementations, the instruction sets and sub-routines of security process 110, which may be stored on storage device, such as storage device 116, coupled to computer 112, may be executed by one or more processors and one or more memory architectures included within computer 112. In some implementations, storage device 116 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 116 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 114 may be connected to one or more secondary networks (e.g., network 118), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 112 may include a data store, such as a database (e.g., relational database, object-oriented database, triplestore database, etc.), a data store, a data lake, a column store, and/or a data warehouse, and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, security process 110 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer

112 and storage device 116 may refer to multiple devices, which may also be distributed throughout the network.

In some implementations, computer 112 may execute an application security posture management (ASPM) process (e.g., ASPM application 120), examples of which may include, but are not limited to, a code scanning application configured to identify vulnerabilities in source code; a secure build orchestration application integrated with a continuous integration/continuous delivery (CI/CD) pipeline to enforce execution of security scans; a policy management application configured to import and apply predefined industry-standard security frameworks (e.g., OWASP, NIST SSDF, or other secure-by-design standards); a remediation tracking application configured to verify correction of vulnerabilities meeting or exceeding a defined severity threshold; a certification report generation application configured to produce sanitized compliance summaries without exposing sensitive vulnerability details; a digital attestation application configured to sign or timestamp certification reports for authenticity verification; a vendor compliance management application configured to associate certification reports with corresponding software builds or software bills of materials (SBOMs); or another application that enables enforcement, verification, and standardized certification of software security posture for vendor-supplied applications. In operation, the above applications may interoperate to enforce and evidence secure software development practices within a vendor environment. For example, the code scanning application may automatically initiate one or more static or dynamic analysis scans on a software build as part of a CI/CD pipeline execution. The policy management application may retrieve a predefined and non-modifiable security profile corresponding to an accepted industry framework (e.g., OWASP or NIST SSDF) and apply the profile to define the scope, depth, and severity thresholds of each scan. The secure build orchestration application may ensure that code promotion or deployment cannot proceed until all vulnerabilities meeting or exceeding the defined severity threshold have been remediated. Upon determining compliance, the certification report generation application may compile scan outcomes into a sanitized certification report that summarizes aggregate vulnerability counts and associated severity levels without revealing proprietary code or detailed exploit data. The digital attestation application may cryptographically sign or timestamp the certification report to ensure its authenticity and traceability. The vendor compliance management application may then associate the generated certification report with the corresponding software build or SBOM and transmit the report to a requesting customer or compliance repository as evidence that the vendor's application has satisfied standardized application security requirements.

[In some implementations, security process 110 and/or ASPM application 120 may be accessed via one or more of client applications 122, 124, 126, 128. In some implementations, security process 110 may be a standalone application, or may be an applet/application/script/extension that may interact with and/or be executed within ASPM application 120, a component of ASPM application 120, and/or one or more of client applications 122, 124, 126, 128. In some implementations, ASPM application 120 may be a standalone application, or may be an applet/application/script/extension that may interact with and/or be executed within security process 110, a component of security process 110, and/or one or more of client applications 122, 124, 126, 128. In some implementations, one or more of client applications 122, 124, 126, 128 may be a standalone application, or may be an applet/application/script/extension that may interact with and/or be executed within and/or be a component of security process 110 and/or ASPM application 120. Examples of client applications 122, 124, 126, 128 may include, but are not limited to, e.g., a code scanning application configured to identify vulnerabilities in source code; a secure build orchestration application integrated with a continuous integration/continuous delivery (CI/CD) pipeline to enforce execution of security scans; a policy management application configured to import and apply predefined industry-standard security frameworks (e.g., OWASP, NIST SSDF, or other secure-by-design standards); a remediation tracking application configured to verify correction of vulnerabilities meeting or exceeding a defined severity threshold; a certification report generation application configured to produce sanitized compliance summaries without exposing sensitive vulnerability details; a digital attestation application configured to sign or timestamp certification reports for authenticity verification; a vendor compliance management application configured to associate certification reports with corresponding software builds or software bills of materials (SBOMs); or another application that enables enforcement, verification, and standardized certification of software security posture for vendor-supplied applications, a chatbot application, a virtual assistant application, a standard and/or mobile web browser, an email application (e.g., an email client application), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, may be executed by one or more processors and one or more memory architectures incorporated into client electronic devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM). Examples of client electronic devices 138, 140, 142, 144 (and/or computer 112) may include, but are not limited to, a personal computer (e.g., client electronic device 138), a laptop computer (e.g., client electronic device 140), a smart/data-enabled, cellular phone (e.g., client electronic device 142), a notebook computer (e.g., client electronic device 144), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone/speaker (such as those embedded within eyeglasses, smart phones, tablet computers, smart televisions, smart speakers, watches, etc.), an infotainment device (e.g., such as those found in vehicles combining information and/or entertainment with optional screens and/or audio for such things as navigation, multimedia, connectivity, voice control, smartphone integration, touchscreen interface, internet and apps, rear-seat entertainment, etc.), a dedicated network device, and combinations thereof. Client electronic devices 138, 140, 142, 144 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 122, 124, 126, 128 may be configured to effectuate some or all of the functionality of security process 110 (and vice versa). Accordingly, in some implementations, security process 110 may be a purely server-side application, a purely client-side application, or a hybrid server-side/client-side application that is cooperatively executed by one or more of client applications 122, 124, 126, 128 and/or security process 110.

In some implementations, one or more of client applications 122, 124, 126, 128 may be configured to effectuate some or all of the functionality of ASPM application 120 (and vice versa). Accordingly, in some implementations, ASPM application 120 may be a purely server-side application, a purely client-side application, or a hybrid server-side/client-side application that is cooperatively executed by one or more of client applications 122, 124, 126, 128 and/or ASPM application 120. As one or more of client applications 122, 124, 126, 128, security process 110, and ASPM application 120, taken singly or in any combination, may effectuate some or all of the same functionality, any description of effectuating such functionality via one or more of client applications 122, 124, 126, 128, security process 110, ASPM application 120, or combination thereof, and any described interaction(s) between one or more of client applications 122, 124, 126, 128, security process 110, ASPM application 120, or combination thereof to effectuate such functionality, should be taken as an example only and not to limit the scope of the disclosure.

In some implementations, one or more of users 146, 148, 150, 152 may access computer 112 and security process 110 (e.g., using one or more of client electronic devices 138, 140, 142, 144) directly through network 114 or through network 118. Further, computer 112 may be connected to network 114 through network 118, as illustrated with phantom link line 154. Security process 110 may include one or more user interfaces, such as browsers and textual or graphical user interfaces, through which users 146, 148, 150, 152 may access security process 110.

In some implementations, the various client electronic devices may be directly or indirectly coupled to network 114 (or network 118). For example, client electronic device 138 is shown directly coupled to network 114 via a hardwired network connection. Further, client electronic device 144 is shown directly coupled to network 118 via a hardwired network connection. Client electronic device 140 is shown wirelessly coupled to network 114 via wireless communication channel 156 established between client electronic device 140 and wireless access point (i.e., WAP 158), which is shown directly coupled to network 114. WAP 158 may be, for example, an IEEE 802.11a, 802.11b, 802.11g, 802.11n, 802.11ac, Wi-Fi®, RFID, and/or Bluetooth™ (including Bluetooth™ Low Energy) or any device that is capable of establishing wireless communication channel 156 between client electronic device 140 and WAP 158 (e.g., Zigbee, Z-Wave, etc.). Client electronic device 142 is shown wirelessly coupled to network 114 via wireless communication channel 160 established between client electronic device 142 and cellular network/bridge 162, which is shown by example directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used. In some implementations, computer 112 may be directed or controlled by an operator. Computer 112 may be hosted by one or more of assets owned by the operator, assets leased by the operator, and third-party assets. The assets may be referred to as a private, community, or hybrid cloud computing network or cloud computing environment. For example, computer 112 may be partially or fully hosted by a third-party offering software as a service (Saas), platform as a service (PaaS), and/or infrastructure as a service (IaaS). Computer 112 may be implemented using agile development and operations (DevOps) principles. In some implementations, some or all of computer 112 may be implemented in a multiple-environment architecture. For example, the multiple environments may include one or more production environments, one or more integration environments, one or more development environments, etc.

In some implementations, various I/O requests (e.g., I/O request 115) may be sent from, e.g., client applications 122, 124, 126, 128 to, e.g., computer 112 (and vice versa). Examples of I/O request 115 may include but are not limited to, data write requests (e.g., a request that content be written to computer 112) and data read requests (e.g., a request that content be read from computer 112). Client electronic devices 138, 140, 142, 144 and/or computer 112 may also communicate audibly using an audio codec, which may receive spoken information from a user and convert it to usable digital information. An audio codec may likewise generate audible sound for a user, such as through a speaker, e.g., in a handset of a client electronic device. Such sound may include sound from voice telephone calls, may include recorded sound (e.g., voice messages, music files, etc.) and may also include sound generated by applications operating on the client electronic devices.

Figure 2:
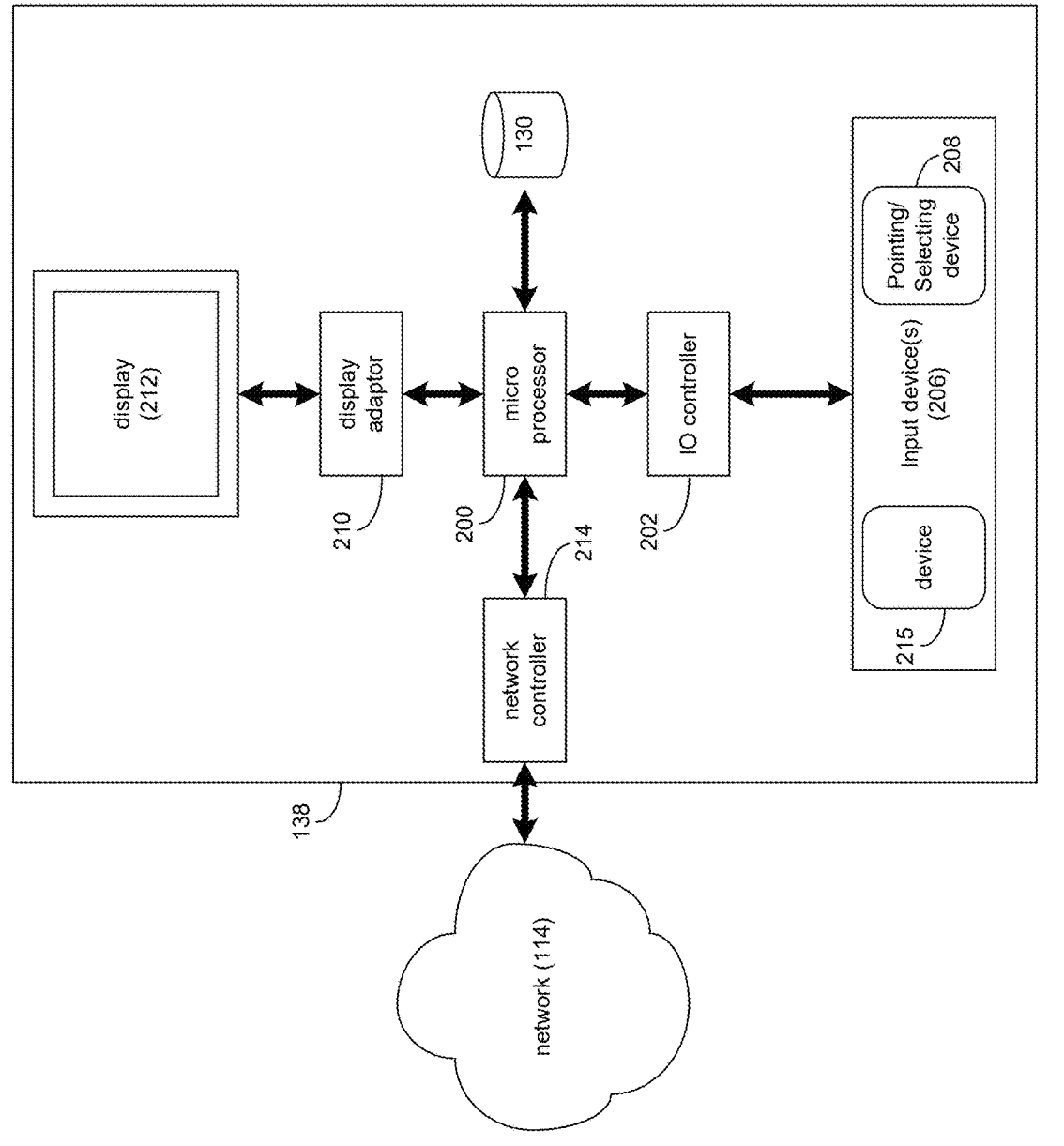
FIG. 2 is an example diagrammatic view of a client electronic device of FIG. 1 according to one or more example implementations of the disclosure.
Figure 3:
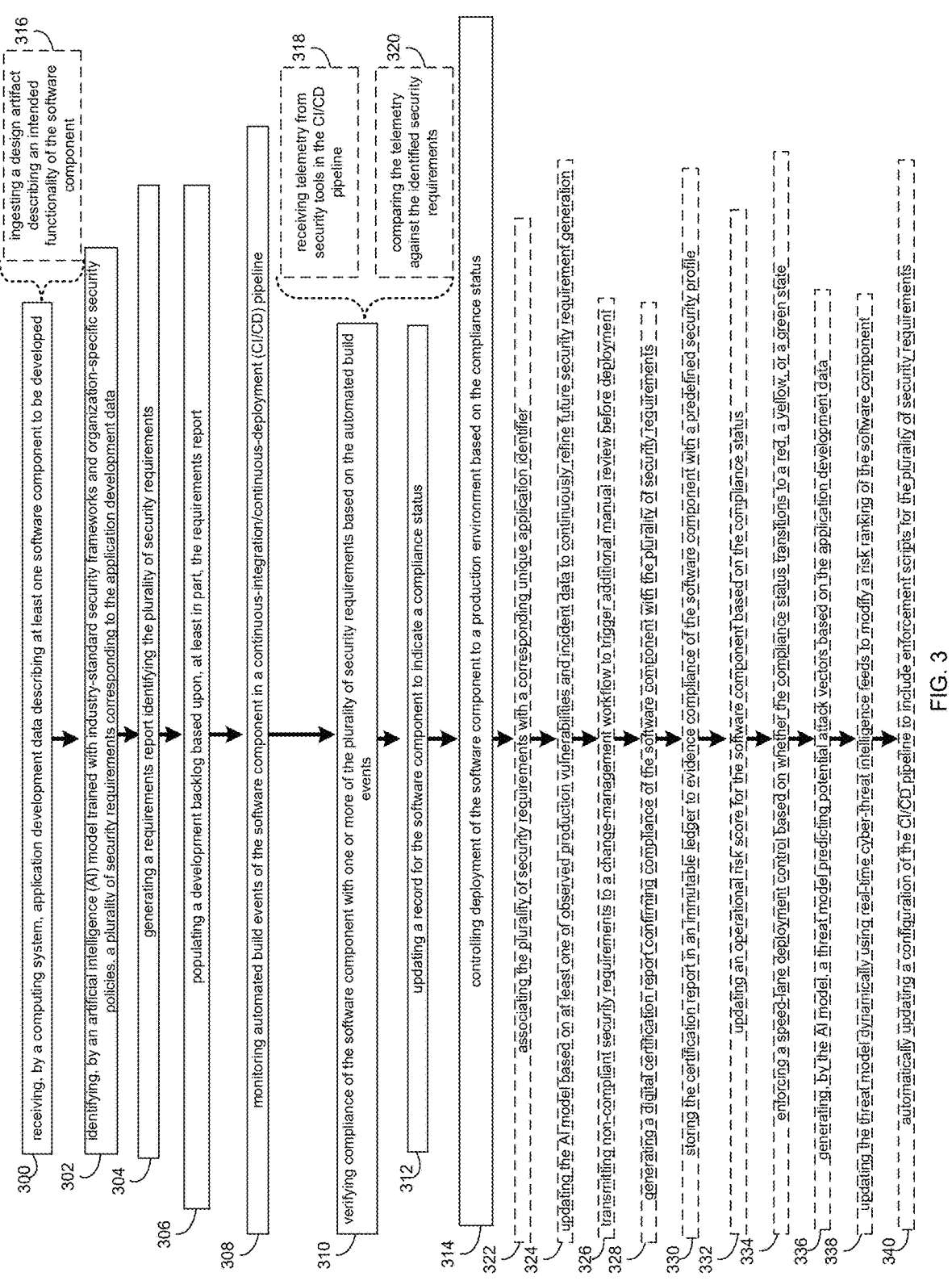
FIG. 3 is an example flowchart of a security process according to one or more example implementations of the disclosure.

Referring also to the example implementation of FIG. 2, there is shown a diagrammatic view of client electronic device 138. While client electronic device 138 is shown in this figure, this is for example purposes only and is not intended to be a limitation of this disclosure, as other configurations are possible. Additionally, any computing device capable of executing, in whole or in part, security process 110 may be substituted for client electronic device 138 (in whole or in part) within FIG. 2, examples of which may include but are not limited to computer 112 and/or one or more of client electronic devices 138, 140, 142, 144.

In some implementations, client electronic device 138 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 130). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), scanner, custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to network 114 (e.g., the Internet or a local area network).

The Graphical Security Blueprint:

As discussed above and referring also at least to the example implementations of FIGS. 3-6, in some implementations, security process 110 may receive, via a graphical user interface, user input describing application requirements of an application, and in some implementations, the user input may be collected using a questionnaire-based web form. For instance, security process 110 begins by collecting information from the person requesting a security blueprint. As a non-limiting example, imagine a project team at a bank that needs to launch a new online application. Instead of writing lengthy technical documents, the requester opens a web form 400 like the one shown in FIG. 4. They answer structured questions about who will use the system, what kind of data it will handle, and what level of sensitivity the data has. These answers provide the raw material for the automated process that will later generate a graphical security blueprint (GSB).

In some implementations, the graphical user interface (GUI) may be delivered as a secure web application built on a client-server model. The front end runs in a browser, providing structured form fields such as dropdowns, checkboxes, and text inputs. Each question is linked to a unique identifier so that when the form is submitted, the backend service translates the answers into a structured data object (for example, JSON). This object contains key-value pairs mapping each requirement to a predefined attribute. The interface enforces input validation to reduce errors and ensures data integrity. This provides a repeatable, standardized method for gathering application requirements, minimizing the ambiguity that often arises when requirements are gathered informally.

In some implementations, the GUI is implemented as a desktop application with an offline mode. Here, the questionnaire responses are cached locally in a lightweight database such as SQLite. When network connectivity is available, the responses synchronize with the main server. This variant requires additional logic for conflict resolution in case two offline sessions attempt to update the same application record. The benefit is that it allows users working in restricted or disconnected environments to still prepare the necessary input without relying on constant connectivity.

In some implementations, a conversational interface, such as a chatbot integrated into an enterprise collaboration platform, may be used. Instead of (or in addition to) filling out a traditional form, the user answers a guided sequence of natural-language questions. These answers are parsed through natural language processing (NLP) modules, which map key terms into structured fields similar to those noted above.

In some implementations, security process 110 may process 110 may map the user input to a plurality of security policies maintained in a policy repository. For instance, once the answers from FIG. 4 are collected, security process 110 may compare those answers against an internal library of rules and standards (e.g., via a policy source in FIG. 6). This policy source library contains policies that represent regulatory requirements, company security guidelines, and best practices. By mapping each input field to these policies, security process 110 ensures that user answers are automatically transformed into actionable technical requirements.

For instance, in some implementations, a rules engine of security process 110 processes the structured form data and queries a policy repository stored in a relational database. Each user answer is linked to one or more security policies using predefined mapping tables. For instance, if the form indicates the system is internet-facing, the rules engine queries the policy repository for firewall and DMZ requirements. The technical benefit of this approach is traceability:

each user choice directly links to an authoritative policy source, ensuring consistency and reducing interpretation errors.

In some implementations, instead of static mapping, a machine learning classifier of security process 110 (trained on past projects and policy updates) dynamically recommends which policies apply. AI models analyze the semantic meaning of the user input and predict the most relevant policies, even when inputs are unusual or ambiguous. For example, if a user describes a novel data-sharing arrangement, security process 110 can still propose encryption and data governance requirements. As policies evolve, the AI learns to capture new patterns without requiring every rule to be hard-coded. In some implementations, an NLP-enhanced pipeline parses free-text inputs (if allowed) and aligns them with security taxonomies. AI-powered entity recognition identifies critical terms such as "cloud storage," "partner access," or "payment processing" and maps them to corresponding policy sets. Thus, users can input less-structured requirements, and security process 110 still identifies matching policies.

In some implementations, mapping may comprise identifying that the application uses an Internet connection and, in response, automatically applying requirements for a firewall and demilitarized zone (DMZ). For instance, suppose the project team indicates in FIG. 4 that their new application will be accessible from the Internet. This response triggers security process 110 to apply protective layers automatically. Specifically, security process 110 mandates the use of a firewall and a DMZ as shown in UI 500 in FIG. 5. A DMZ may generally be described as a controlled buffer area that sits between an organization's internal network and the external Internet (or other untrusted networks). As a result, this ensures that external users cannot directly access sensitive internal systems.

In some implementations, the policy engine of security process 110 cross-references the "internet-facing" input field and appends predefined firewall and DMZ requirements to the requirements set. These are represented as reusable components in component library in FIG. 6. The benefit is automation of well-established security patterns, saving architects from manually checking basic conditions.

In some implementations, an AI-driven network modeling tool of security process 110 evaluates the traffic patterns described in user input and suggests not only a DMZ but also the most efficient firewall configuration (e.g., stateful vs. application-layer filtering). The AI can simulate potential attack vectors and propose optimized placement of these controls. Thus, higher precision is realized, as security blueprints are not generic but adapted to anticipated risks.

In some implementations, security process 110 integrates with external threat intelligence feeds and, based on current vulnerabilities, adjusts DMZ and firewall configurations dynamically. If a surge in attacks targeting a particular port is detected, the generated blueprint automatically includes stricter firewall rules.

In some implementations, mapping may comprise identifying that the application requires an external data feed and, in response, automatically applying requirements for an Application Programming Interface (API) gateway. For instance, when the questionnaire of FIG. 4 indicates that the application must integrate with an external data source, the mapping engine of security process 110 interprets this requirement and selects appropriate safeguards from the policy repository. These safeguards define the use of an API gateway, which acts as a broker for all inbound and outbound traffic between the internal system and the external feed. The gateway ensures that communication is authenticated, encrypted, validated, and logged before data crosses into the secure zone, thereby reducing the risk of compromised or malformed information entering the environment. In the example, a graphical security blueprint (not shown), the gateway is automatically positioned between the external source and the application's integration tier.

In some implementations, the mapping engine of security process 110 triggers on the "external feed" field in the questionnaire and queries the policy repository (the policy source) for gateway requirements. The retrieved policies specify technical controls such as OAuth-based authentication, schema validation, rate limiting, and message logging. These controls are bound to the gateway component selected from the component library and instantiated in the GSB.

In some implementations, security process 110 draws from a catalog of gateway patterns in a component library in FIG. 6, each designed for a specific integration class. For example, one pattern may be tuned for high-volume third-party APIs, while another may be designed for regulated partner exchanges requiring enhanced audit logging. The appropriate pattern is selected by security process 110 based on metadata in the questionnaire and instantiated into the GSB with configuration parameters adjusted automatically.

In yet another implementation, security process 110 may use AI to analyze the declared data source type and sensitivity. If the source is classified as high risk, such as financial or healthcare data, the AI engine of security process 110 recommends additional layers such as anomaly detection modules or dual-gateway separation for ingress and egress. Conversely, if the feed is publicly available and low sensitivity, the AI engine may recommend a lighter configuration that still enforces integrity checks but reduces processing overhead. This intelligent adjustment tailors gateway protections to the level of risk associated with each external feed.

In some implementations, the plurality of security policies may be dynamically updated from an external policy source (e.g., the policy source). For instance, because security requirements evolve, security process 110 ensures that its repository of policies remains current. The policy repository is designed to synchronize with external sources such as regulatory feeds, industry standards databases, or organizational governance platforms. By continuously refreshing its content, the repository provides the mapping engine with the latest controls, ensuring that newly generated blueprints are aligned with current obligations.

In some implementations, the repository periodically connects to external policy servers over a secure API, retrieves updated control definitions, and stores them with version identifiers. Each update is logged and timestamped, creating an auditable trail of policy evolution. The mapping engine of security process 110 may reference the most recent version when generating new GSBs. In some implementations, the repository adopts an event-driven model where external policy sources push updates directly to the system. A subscription service listens for changes and immediately integrates them into the repository. This allows new policies, such as those addressing emergent vulnerabilities, to be available for mapping without delay.

In yet another implementation, the AI engine of security process 110 monitors a broader set of information streams, including regulatory announcements, vulnerability advisories, and best-practice publications. The AI engine uses natural language processing to extract relevant controls, normalize them into structured policy entries, and flag them for review by administrators before activation (or may be automated without review). This ensures the system rapidly adapts to evolving threats while maintaining oversight and quality control.

In some implementations, security process 110 may generate a set of security requirements based on mapping the user input to the plurality of security policies. For instance, once questionnaire inputs have been mapped to specific policy entries, security process 110 produces a consolidated set of security requirements, shown in the policy source. These requirements form the actionable instructions that define how the application must be secured. Each requirement is tagged with metadata such as compliance references, control descriptions, and implementation guidance.

In some implementations, the requirements generator of security process 110 assembles policy mappings into a structured document, producing both machine-readable output for downstream systems and a human-readable summary for security architects. This ensures that technical and non-technical stakeholders can interpret the results consistently. In some implementations, the requirements are organized hierarchically into categories such as network security, application security, and data protection. This categorization allows reviewers to quickly assess completeness in each domain and provides a structured checklist for auditing. In some implementations, the AI engine of security process 110 prioritizes requirements by assessing historical incident data and threat intelligence feeds. Requirements most critical to reducing organizational risk are highlighted or scheduled with higher urgency in downstream workflows. This adaptive prioritization helps organizations allocate resources effectively while maintaining compliance.

In some implementations, the set of security requirements may include controls for authentication, authorization, and encryption. For instance, core security disciplines such as authentication, authorization, and encryption are consistently represented in the generated requirements. These controls ensure that user identity is verified, access is restricted to approved functions, and sensitive information is protected in transit and at rest.

For example, in some implementations, the requirements engine enforces a baseline template for these three categories. Multifactor authentication, role-based access control, and transport encryption may be automatically applied regardless of other inputs, ensuring that minimum protections are never omitted. In another implementation, security process 110 selects from modular control packages that support different authentication and authorization mechanisms. For example, one module may enforce federated identity with SAML or OIDC, while another applies local credential validation. The correct module is chosen based on the application type.

In some implementations, the AI engine of security process 110 may continuously evaluate recent attack trends and strengthens these controls dynamically. If brute-force login attempts are spiking in the industry, the AI engine may enforce stricter multifactor rules. If new encryption vulnerabilities are disclosed, the AI engine may recommend shifting all TLS requirements to the latest secure version. This ensures that even foundational controls adapt to an evolving threat environment.

In some implementations, security process 110 may assemble, from a component library (e.g., the component library in FIG. 6), a plurality of security components corresponding to the set of security requirements. For instance, once the mapping engine of security process 110 has generated a tailored set of security requirements, security process 110 transitions from abstract obligations to tangible architectural components. At this stage, the security process acts like a design synthesizer: it interprets the requirements and pulls corresponding components from a curated library of security building blocks. Each building block represents a distinct capability, such as a firewall, an intrusion detection appliance, an identity management module, or an encryption service. These components are not mere icons but are defined with attributes, expected behaviors, and policy bindings that allow them to be automatically incorporated into the GSB For instance, in some implementations, the assembly engine of security process 110 maintains an indexed component library where each component is associated with metadata fields such as supported protocols, compliance frameworks, capacity thresholds, and interoperability constraints. When requirements are finalized, the assembly engine queries the component library to identify components that satisfy each requirement. For example, if the requirement specifies multi-factor authentication, the component engine retrieves an identity provider component that is pre-configured for federated login and adaptive challenge policies. These retrieved components are then instantiated within the blueprint's underlying graph data structure, with their metadata linked to the originating requirements for traceability. This ensures that every control requirement has a corresponding technical embodiment and that reviewers can trace each component back to the requirement it fulfills.

In some implementations, the assembly engine uses a staged approach where components are initially added to the blueprint as vendor-neutral abstractions. At this stage, the blueprint reflects functions like "firewall" or "web application gateway" without committing to a specific product or technology. These abstractions are defined with generalized attributes and interfaces, making them portable across different deployment contexts. Later, during deployment or integration, these neutral placeholders can be mapped to concrete vendor implementations through a resolution process that considers organizational standards, procurement preferences, or performance requirements. This approach allows blueprints to serve as authoritative architectural documents while remaining adaptable to evolving infrastructure choices.

In some implementations, AI may play a role in selecting and tailoring components. An AI recommendation engine of security process 110 analyzes historical blueprint data, performance metrics, and contextual information about the new application, such as expected traffic volume, data sensitivity, and integration points, to recommend the most suitable variant of a component. For instance, the AI recommendation engine might determine that a high-throughput firewall cluster is appropriate for a public-facing banking application, while a lightweight virtual firewall suffices for an internal administrative tool. The AI recommendation engine may also optimize component placement within the blueprint by analyzing dependency graphs to minimize latency or by suggesting additional redundancy in high-risk pathways. By embedding AI into the assembly process, security process 110 not only ensures compliance with requirements but also adapts the technical design to operational realities and evolving threats. Through these embodiments, the assembly stage transforms policy-driven requirements into a living architectural model. This ensures that the resulting security blueprint is both actionable and technically aligned with the application's operational context, bridging the gap between abstract policy language and deployable design.

In some implementations, assembling the plurality of security components may comprise creating reusable blocks and mini-patterns stored in the component library. For instance, beyond individual components, security process 110 can assemble predefined clusters of components known as mini-patterns. These mini-patterns function as reusable architectural fragments that capture common security scenarios. Instead of manually piecing together a firewall, intrusion prevention system, and web gateway every time an Internet-facing application is identified, the assembly engine of security process 110 can retrieve a mini-pattern representing a complete perimeter protection structure. The use of mini-patterns accelerates blueprint generation, enforces uniformity, and reduces the cognitive burden on architects by embedding expertise directly into the component library.

For example, in some implementations, mini-patterns are curated and approved by security architects who distill complex arrangements of components into standardized templates. As shown in the example UI 500 in FIG. 5, the results of the questionnaire from FIG. 4 shown in an easy to read template that can be either approved or disapproved by security architects. Each mini-pattern is annotated with conditions for use, such as "apply when Internet access is true" or "apply when external data feed is required." When the assembly engine processes a new set of requirements, it matches these conditions and automatically instantiates the corresponding mini-pattern into the blueprint. This ensures that proven architectures are consistently applied without requiring repeated manual design decisions.

In some implementations, mini-patterns are parameterized, allowing them to be adapted for different project contexts while maintaining a consistent structure. For example, a perimeter mini-pattern may include adjustable parameters for firewall throughput, logging destinations, or encryption standards. When instantiating the pattern, the assembly engine binds values from the questionnaire responses or organizational defaults to these parameters, creating a customized yet standardized architecture. This approach combines efficiency with adaptability, ensuring that the same high-level design can be deployed in multiple contexts without compromising alignment to organizational standards.

In some implementations, AI enhances the mini-pattern lifecycle by identifying recurring arrangements across previously generated blueprints and automatically proposing them as candidates for new patterns. The AI engine of security process 110 analyzes stored blueprints, clusters them by structural similarity, and detects common combinations of components that appear frequently. These combinations are then packaged into mini-patterns and added to the library for reuse in future projects. Over time, this AI-assisted learning process evolves the library, making it more representative of actual organizational practices and emerging architectural needs.

Through these example embodiments, the use of reusable blocks and mini-patterns transforms the assembly process from a case-by-case exercise into a scalable and continuously improving design methodology. This ensures that each blueprint not only satisfies requirements but also reflects accumulated expertise and best practices.

In some implementations, the mini-patterns may represent security architectures for standardized application types. For instance, mini-patterns are not limited to arbitrary combinations of security components; they may also embody complete architectures that are tailored to well-recognized categories of applications. Security process 110 may rely on standardized application types that share common risk profiles and compliance obligations. For example, an online banking portal requires stringent perimeter defenses, strong authentication, and continuous monitoring, whereas a customer-facing e-commerce site requires secure payment handling, web application firewalls, and data encryption safeguards. By encoding these architectures into mini-patterns, security process 110 allows new projects of similar type to begin with a hardened and regulation-ready design from the outset.

In some implementations, the component library includes mini-patterns that are aligned with specific regulatory frameworks. A financial application type mini-pattern may embed controls consistent with payment card security standards, such as segmentation of cardholder data environments and the inclusion of network intrusion detection sensors. A healthcare application type mini-pattern may incorporate access logging, data anonymization components, and encryption services that reflect health privacy regulations. When a user identifies their project as belonging to one of these categories in the questionnaire of FIG. 4, security process 110 automatically instantiates the corresponding mini-pattern in the blueprint. This embodiment ensures compliance by default and relieves designers from manually translating regulatory frameworks into technical architectures.

In some implementations, the mini-patterns evolve over time based on operational experience and audit findings. Each time a project undergoes a security assessment or a compliance audit, feedback is captured and adjustments are made to the relevant mini-patterns. If a recurring weakness is identified, such as insufficient logging coverage, the pattern is updated so that future blueprints for that application type automatically include enhanced logging controls. This creates a living repository of standardized architectures that reflect both regulatory requirements and organizational lessons learned.

In some implementations, AI assists in the recognition and refinement of standardized patterns. By analyzing stored blueprints across many projects, the AI engine of security process 110 can cluster them according to shared characteristics such as external exposure, data sensitivity, or transaction type. These clusters reveal archetypes of applications that naturally align with distinct security architectures. The AI engine then synthesizes these findings into proposed mini-patterns, which are reviewed and added to the library. Over time, this process not only codifies existing standards but also detects emerging categories of applications, ensuring that the library keeps pace with innovation. Thus, mini-patterns representing standardized application types become a cornerstone of the system. They provide a direct link between regulatory and operational requirements on one hand, and technical blueprint design on the other, enabling rapid, consistent, and compliant architecture generation.

In some implementations, security process 110 may generate a graphical security blueprint by interconnecting the plurality of security components according to pre-approved dataflows. For example, after components and mini-patterns are selected and assembled, security process 110 produces a graphical representation of the complete security architecture. This graphical security blueprint depicts not only the individual components but also the pathways through which data flows between them. The interconnections are governed by a catalog of pre-approved dataflows that specify how information is permitted to travel between zones, services, and external entities. By constraining connectivity to these vetted pathways, the GSB ensures that designs do not introduce unauthorized or risky channels of communication.

For instance, in some implementations, the blueprint is constructed using an internal graph model in which each node represents a component and each edge represents a dataflow. The assembly engine references a policy store of approved communication patterns, such as "Internet zone to DMZ via firewall" or "DMZ to application tier via API gateway." In some implementations, only connections that match these patterns are instantiated. Once the model is complete, a rendering module translates it into a visual diagram, arranging nodes according to layered security zones and labeling edges with protocol and control information. This ensures that the blueprint is both machine-verifiable and human-readable.

In some implementations, security process 110 uses a layout engine that automatically arranges components and dataflows to highlight security zones, trust boundaries, and inspection points. Components such as firewalls or gateways are deliberately placed at boundaries between zones, while sensitive stores are positioned deep within protected layers. The visual output is generated in scalable formats such as vector graphics or PDF so that it can be easily shared, embedded in documentation, or integrated with enterprise modeling tools. This embodiment provides clarity, consistency, and portability of the design across the organization.

In some implementations, AI enhances the generation process by analyzing the draft topology and recommending optimizations. The AI engine of security process 110 may identify potential bottlenecks in dataflows, suggest redundancy where critical services have single points of failure, or propose additional monitoring flows for high-risk connections. The AI engine may also learn from prior blueprint reviews, adjusting future layouts to highlight areas that frequently receive scrutiny from auditors or architects. By incorporating AI, the GSB becomes not only a static diagram but a dynamic design aid that adapts to context and improves resilience. The generation of the graphical blueprint translates abstract requirements and component selections into a comprehensive architectural artifact, capturing both structure and flow, ensuring that designs are visually clear, policy-compliant, and technically optimized.

In some implementations, the graphical security blueprint may be generated as a machine-readable file compatible with compliance systems. For instance, in addition to producing a human-readable diagram, security process 110 encodes the blueprint as a machine-readable artifact that can be ingested by compliance platforms. This dual-format output ensures that the blueprint can serve both as a visual communication tool for architects and as a structured dataset for automated governance. By enabling automated compliance checks, security process 110 eliminates manual transcription errors and accelerates audit readiness.

For instance, in some implementations, the blueprint is exported in structured data formats such as XML or JSON that adhere to schemas recognized by compliance verification tools. Each component and dataflow in the blueprint is annotated with metadata tags that reference the underlying policies and regulatory controls they fulfill. Compliance systems of security process 110 can then parse the file, match the annotations against control catalogs, and verify adherence automatically.

In some implementations, security process 110 transmits the blueprint directly to compliance systems via secure application programming interfaces. Instead of producing a static file, security process 110 uses APIs to synchronize blueprints continuously, ensuring that compliance platforms always have access to the latest version. This approach minimizes latency between design changes and compliance validation and ensures that regulatory obligations are enforced in near real time.

In some implementations, the AI engine of security process 110 dynamically adapts the export format based on the target compliance system. The AI engine recognizes the capabilities and schema of the receiving platform, reformats the blueprint accordingly, and validates compatibility before transmission. By learning from prior export failures or mismatches, the AI engine continually improves the fidelity of the integration, allowing organizations with heterogeneous compliance systems to maintain a consistent design-to-audit pipeline.

In some implementations, security process 110 may store the graphical security blueprint and associated metadata in a system of record (e.g., shown in FIG. 6), and in some implementations, security process 110 may assign an application identifier to the graphical security blueprint for indexing in the system of record. For instance, once created, the GSB and all of its associated metadata are archived in a system of record. This repository functions as the authoritative source of truth for security designs, ensuring that every blueprint can be retrieved, reviewed, and audited over the lifecycle of the application. To enable efficient indexing and retrieval, each blueprint is assigned a unique application identifier (e.g., ID X, ID Y, ID Z, etc.) that links the blueprint to its corresponding project or system.

In some implementations, the blueprint and metadata are stored in a structured repository, where indexing supports queries by application identifier, project owner, version, or date of creation. Metadata fields may include not only the technical components but also contextual information such as the risk classification, applicable regulatory frameworks, and approval status. This structured storage provides a powerful audit trail and simplifies search operations.

In some implementations, the repository is implemented using immutable append-only storage such as a blockchain ledger. Each blueprint and its metadata are committed as a block, with cryptographic hash chaining ensuring that no historical record can be tampered with. This embodiment is particularly beneficial for industries that demand provable integrity of security documentation, such as financial services or healthcare.

In some implementations, the AI engine of security process 110 enriches the metadata automatically before storage. For example, the AI engine may tag the blueprint with descriptors like "external-facing," "multi-tier," or "sensitive-data-handling," inferred from the design itself. These intelligent tags enable faster and more nuanced search and retrieval, as well as analytics that reveal organizational trends across stored blueprints.

In some implementations, storing may comprise versioning successive drafts of the graphical security blueprint. For instance, because applications evolve, blueprints often require modification. To capture this evolution, security process 110 maintains successive drafts, each stored as a distinct version (e.g., V1, V2, etc.) with complete metadata. This versioning allows stakeholders to track design changes over time, compare prior drafts, and roll back if necessary.

In some implementations, security process 110 assigns sequential identifiers to each draft and links them through a parent-child lineage structure. Metadata for each version includes author, timestamp, and a description of the changes made. This ensures traceability and accountability for all design decisions. In some implementations, the repository maintains differential records that capture only the changes between versions rather than duplicating the entire blueprint each time. Earlier drafts can be reconstructed on demand by applying stored differences to a baseline version. This embodiment optimizes storage usage while retaining full historical visibility.

In some implementations, the AI engine of security process 110 automatically generates summaries of the differences between versions. For instance, the AI engine might highlight that "a web application firewall was added to the DMZ" or that "encryption standard was upgraded from TLS 1.2 to TLS 1.3." These natural language summaries reduce review time and help stakeholders quickly understand the significance of changes.

In some implementations, security process 110 may dynamically update the graphical security blueprint in response to changes in one or more of the plurality of security policies. For instance, stored blueprints are not static artifacts; they evolve as security policies change. When regulatory requirements or organizational standards are updated, security process 110 ensures that existing blueprints are refreshed to remain aligned with the new obligations. This dynamic updating reduces the risk of drift between approved policy and actual design.

For example, in some implementations, security process 110 periodically polls the policy repository for updates. When a new or modified policy is detected, the mapping engine recalculates which components and dataflows are affected. It then regenerates the impacted sections of the blueprint and stores the updated draft as a new version in the system of record. This ensures that changes are systematically applied without manual oversight.

In some implementations, security process 110 subscribes to an event-driven feed of policy updates. Whenever a new requirement is published, an event is triggered that prompts immediate recalculation and blueprint regeneration. Affected blueprints are updated in real time, and stakeholders are notified of the modifications. This ensures near-instantaneous alignment between design and policy. In some implementations, the AI engine of security process 110 analyzes the scope and impact of policy updates before applying them. The AI engine evaluates the dependency graph of components across stored blueprints to predict which applications are most affected. It then prioritizes updates based on risk, ensuring that high-impact changes such as new encryption mandates are applied before less critical updates. This intelligent prioritization minimizes disruption while ensuring comprehensive coverage.

In some implementations, security process 110 may export the set of security requirements into a workflow management system in FIG. 6. For instance, after the blueprint is generated (e.g., via the questionnaire results from I/O 115), the identified security requirements should be acted upon by engineering and operations teams. To make these requirements actionable, security process 110 exports them into workflow management platforms where they are tracked as tasks. This linkage ensures that the abstract controls captured in the blueprint directly drive concrete implementation work.

For example, in some implementations, the requirements are serialized into structured task objects and transmitted through secure APIs to the organization's workflow management system. Each requirement becomes a ticket that includes contextual metadata such as originating application ID, risk priority, and due dates. This embodiment provides end-to-end traceability from the questionnaire inputs of FIG. 4 through to the engineering execution. In some implementations, requirements are broadcast over enterprise message queues (e.g., via I/O 115) to multiple workflow systems simultaneously. Large organizations may rely on different project management platforms across teams, and this approach ensures consistency by synchronizing requirements across all systems. Each system subscribes to the feed and translates requirements into its own native task structure.

In yet another implementation, the AI engine of security process 110 enriches the export process by prioritizing requirements based on relative risk and historical bottlenecks. The AI engine may assign higher urgency to encryption or access control requirements, while scheduling less critical requirements for later implementation. This allows limited engineering resources to be allocated efficiently while still satisfying compliance obligations.

In some implementations, security process 110 may validate the graphical security blueprint against regulatory standards (e.g., via the policy source). For instance, validation is beneficial before an application can proceed to deployment. The generated GSB may be systematically checked against regulatory standards and internal benchmarks to confirm compliance. This validation ensures that the blueprint is not only structurally correct but also legally and operationally sufficient.

For example, in some implementations, the validation engine of security process 110 cross-references each component and dataflow in the GSB against a control catalog derived from regulations, such as PCI DSS, HIPAA, or ISO 27001. Any missing or misaligned controls are flagged, and a remediation notice is attached to the blueprint record. In some implementations, validation occurs through direct queries to external compliance databases. Security process 110 leverages APIs to confirm that controls embedded in the blueprint conform to the latest regulatory requirements, thereby minimizing reliance on outdated checklists. This real-time validation accelerates audit readiness.

In some implementations, the AI engine of security process 110 compares the blueprint against historical compliance failures across the organization. The AI engine identifies patterns of recurring deficiencies and proactively recommends corrective measures before submission for audit. This predictive approach reduces the likelihood of repeated errors and strengthens overall compliance posture.

In some implementations, security process 110 may generate a risk assessment report associated with the graphical security blueprint. For instance, beyond compliance validation, security process 110 produces a comprehensive risk assessment report to guide decision-makers. This report highlights vulnerabilities, assigns severity scores, and recommends mitigation strategies based on the generated blueprint. It transforms the blueprint from a static architectural diagram into a dynamic risk management tool.

For example, in some implementations, the report is derived directly from the blueprint topology. External interfaces, sensitive data stores, and privileged access pathways are automatically identified as high-risk elements. Each is assigned a severity score, and remediation steps are linked to specific controls in the component library. In some implementations, the risk assessment report integrates threat intelligence feeds. If a vulnerability is discovered in a class of components used in the blueprint, for example, a known weakness in a particular API gateway, the risk score for that component is automatically raised. This ensures that the report reflects current threat conditions.

In some implementations, the AI engine of security process 110 simulates potential attack scenarios by analyzing the blueprint graph as if it were a target network. The AI engine evaluates paths an attacker might take to escalate privileges or exfiltrate data and produces a ranked list of likely attack vectors. It then recommends additional safeguards to break these paths, providing forward-looking insight into how the blueprint might be exploited in practice.

In some implementations, the graphical security blueprint may be made accessible for approval. For instance, as shown in the example implementation of FIG. 5 with UI 500, before an application moves toward deployment, stakeholders such as security architects, compliance managers, and business owners may review and approve the SBP. Security process 110 therefore provides mechanisms for controlled access, commentary, and formal sign-off.

For example, in some implementations, the blueprint is published to a secure portal with role-based access control. Reviewers can view the graphical design, inspect the linked requirements, and attach annotations or questions. Once satisfied, reviewers register their approval, which is stored with the blueprint record for audit purposes. In some implementations, approval workflows are integrated directly into enterprise governance platforms. In the example, the blueprint does not advance to the change management stage until electronic signatures from designated roles are collected, ensuring governance discipline and prevents unauthorized progress.

In yet another implementation, the AI engine of security process 110 may analyze approval histories to identify bottlenecks and inefficiencies in the review process. If the AI engine detects that certain types of requirements consistently delay approval, it may recommend pre-validation steps or enhanced automation to streamline future reviews, improving governance efficiency without compromising oversight.

In some implementations, security process 110 may integrate the graphical security blueprint with a downstream system for automated change management. For instance, the blueprint is not simply stored as a static artifact; it is integrated into systems that manage infrastructure changes. This integration ensures that the approved design directly informs operational implementation, closing the loop between architectural intent and real-world deployment.

For instance, in some implementations, the blueprint specifications are exported into change management platforms. Each required adjustment, such as adding a firewall rule or enabling encryption, is logged as a change record. These records are scheduled, executed, and tracked according to enterprise change management procedures. This guarantees traceability from design decision to operational action. In another implementation, the GSB feeds directly into continuous deployment pipelines. Security process 110 translates blueprint components into infrastructure-as-code templates, which are versioned and deployed automatically. This embodiment accelerates adoption by eliminating manual re-interpretation of the blueprint during deployment.

In yet another implementation, the AI engine of security process 110 continuously monitors production environments and compares them against the approved blueprint. If the AI engine detects divergence, such as a missing control or an unauthorized configuration change, it can trigger automated remediation workflows or escalate alerts to administrators, ensuring that the deployed environment remains consistent with the approved GSB over time, even as systems evolve.

The Security Process:

Modern organizations increasingly rely on rapid software development pipelines that incorporate code from diverse internal teams, third-party vendors, and open-source repositories. While such agile and decentralized development accelerates innovation, it also increases the likelihood that security requirements are inconsistently defined or incompletely implemented. In particular, developers are often unaware of the precise set of security controls applicable to a given technology stack, data classification, or hosting environment, resulting in code that fails to comply with recognized frameworks such as the National Institute of Standards and Technology (NIST) Secure Software Development Framework (SSDF), the Open Worldwide Application Security Project (OWASP) Top Ten, or internal enterprise security policies.

Existing Application Security Posture Management (ASPM) tools and continuous-integration/continuous-deployment (CI/CD) pipeline controls can perform internal code scanning, policy enforcement, and vulnerability detection; however, these tools typically operate reactively, after code is written or submitted for deployment, and require manual mapping of security requirements to each project. Survey-based products such as SD Elements provide partial automation but depend on developer-completed questionnaires that are often executed late in the release cycle, leading to incomplete or "pencil-whipped" compliance. As a result, organizations lack an automated, standardized mechanism for determining, at design time, which security requirements apply to a given application and for continuously enforcing those requirements throughout the development and production lifecycle.

Therefore, as will be described in greater detail below, the present disclosure provides a security process that employs an artificial-intelligence (AI) model trained on industry frameworks and organization-specific policies to automatically generate, validate, and enforce security requirements across the software development lifecycle. In some implementations, the AI model analyzes design artifacts or documentation to identify relevant controls, generates a structured set of requirements, and transmits those requirements to a CI/CD pipeline for automated verification. The system may further synchronize compliance data with an information-technology service-management (ITSM) platform, such as ServiceNow, to maintain a continuously updated record of each application's security posture. The security process can dynamically adjust compliance status indicators (e.g., red/yellow/green) based on real-time telemetry, production vulnerabilities, or threat-intelligence feeds, and may automatically trigger deployment gating or change-management actions when risk thresholds are exceeded. By connecting secure-by-design modeling with build-pipeline enforcement and ITSM governance, the disclosed approach enables measurable, continuously verifiable adherence to security frameworks without disrupting developer workflows.

As discussed above and referring also at least to the example implementations of FIGS. 3-8, security process 110 may receive 300, by a computing system, application development data describing at least one software component to be developed. Security process 110 may identify 302, using an artificial intelligence (AI) model trained with industry-standard security frameworks and organization-specific security policies, a plurality of security requirements corresponding to the application development data. Security process 110 may generate 304 a requirements report identifying the plurality of security requirements. Security process 110 may populate 306 a development backlog based upon, at least in part, the requirements report. Security process 110 may monitor 308 automated build events of the software component in a continuous-integration/continuous-deployment (CI/CD) pipeline. Security process 110 may verify 310 compliance of the software component with one or more of the plurality of security requirements based on the automated build events. Security process 110 may update 312 a record for the software component to indicate a compliance status. Security process 110 may control 314 deployment of the software component to a production environment based on the compliance status.

In some implementations, security process 110 may receive 300, by a computing system, application development data describing at least one software component to be developed, and receiving the application development data may include ingesting 316 a design artifact describing an intended functionality of the software component. For instance, assume for example purposes only that a development team begins designing a new financial-services application. Before any code is written, the developer uploads a document, such as a system diagram or functional specification, into the example UI 400 shown in FIG. 4. Security process 110 analyzes this uploaded design artifact to understand what the application will do and how it will interact with data and users. This early intake replaces the conventional manual survey step that developers typically complete late in the release cycle. By automatically receiving structured and unstructured design data at the start of the project, security process 110 positions security requirements upstream, ensuring that secure-by-design principles are embedded from the first planning stage rather than retrofitted just before deployment.

For example in some implementations, security process 110 is hosted on a cloud-based server cluster and exposes an intake API that accepts various design-time artifacts such as word-processing files, spreadsheets, architecture diagrams, or configuration templates. The intake module of security process 110 employs a preprocessing pipeline to extract metadata (for example, project name, component type, data categories, and external interfaces). Optical-character recognition and text-parsing engines convert graphical diagrams into machine-readable text objects, and the resulting normalized dataset is stored in a structured repository, indexed by project identifier, and passed to the AI inference layer for subsequent requirement generation. This approach enables fully automated ingestion of heterogeneous design documents without imposing additional effort on developers, allowing the security process to begin requirement generation as soon as architectural artifacts exist.

In another implementation, the application development data is transmitted directly from a collaborative development platform rather than uploaded manually. The platform emits a JSON-formatted event each time a new project or feature branch is created, and security process 110 subscribes to these events and retrieves the corresponding design metadata over a message-queuing protocol. This approach eliminates reliance on manual uploads and ensures that security intake occurs in real time whenever new development work begins, reducing lag between project creation and requirement assessment.

In some implementations, security process 110 operates within an on-premises environment using an agent installed on developer workstations. The agent (e.g., via security process 110) monitors designated folders or repositories for new or modified design files, then encrypts and transmits those files to the central security process 110 via a secure transport layer (for instance, mutual-TLS). The local-agent configuration is suited to highly regulated environments where external connectivity is restricted, enabling the same automated intake benefits while maintaining data-sovereignty and compliance controls.

In some implementations, security process 110 may identify 302, using an artificial intelligence (AI) model trained with industry-standard security frameworks and organization-specific security policies, a plurality of security requirements corresponding to the application development data, where, in some implementations, the AI model may be trained using non-functional security requirements from at least one of NIST, PCI-DSS, ISO-27001, and OWASP, in combination with internal organizational standards, and where the AI model may perform natural-language processing to extract contextual indicators of technology stack, hosting environment, and data classification to determine relevant security controls. For instance, once the uploaded design artifact has been received, security process 110 begins interpreting what security obligations apply to that project. In the example use case, the AI model within security process 110 analyzes the text and metadata extracted from the uploaded document to determine, for example, that the new application will handle customer financial data, connect to an external payment API, and operate in a public cloud environment. Drawing upon its training on standards such as NIST, PCI-DSS, ISO-27001, and OWASP, the AI correlates these contextual cues with known control families to identify applicable safeguards, such as encryption in transit, credential vaulting, or network segmentation. By using natural-language processing (NLP), the model can interpret free-form descriptions like "user payment portal hosted in Azure" or "stores personally identifiable information (PII)" and automatically translate those into formalized security requirements. This process ensures that every new project is assessed against consistent, traceable policy sources.

For example, in some implementations, the AI model comprises a hybrid transformer-based neural network combined with a rules-based expert engine. During training, labeled datasets are constructed from published security frameworks and the organization's internal control library, each annotated with metadata linking control statements to contextual triggers such as "data classification=confidential" or "environment=public cloud." When new application data is received, a preprocessing module of security process 110 tokenizes the text and generates embeddings representing its semantic content. The model infers likely control categories by computing cosine similarity between these embeddings and those in the training corpus, and the rules-based component refines the output by enforcing logical dependencies (for instance, if "handles payment information" is detected, then PCI encryption and access-logging controls are automatically appended). This combination yields interpretable, high-accuracy mappings from unstructured design inputs to precise, auditable security requirements, significantly reducing the manual effort and variability of human review.

In some implementations, the AI model uses a knowledge-graph approach. Each node represents a security control or requirement, and edges define relationships between technologies, data types, and regulatory obligations. The graph is populated from standard frameworks and organizational policies, and NLP extraction populates new nodes and edge weights based on language detected in the design artifact. Reasoning algorithms of security process 110 traverse the graph to determine which controls are activated by the context (for example, "contains PII"→ "requires data masking"→ "enforce access controls"). As a result, security process 110 provides high explainability, allowing compliance officers to trace exactly how a given control was derived and supporting automated evidence generation for audits.

In some implementations, security process 110 employs a multi-stage classification pipeline. A first classifier determines the technology stack (e.g., web app, mobile, API), a second classifier infers data sensitivity, and a third applies regulatory mappings. Outputs are aggregated in a weighted confidence model that selects the final requirement set. Training data includes prior project submissions and post-deployment audit outcomes, allowing the system to learn from real organizational experience. As a result, security process 110 supports incremental retraining and adaptation to evolving internal standards or emerging regulatory frameworks without full model retraining, ensuring the AI remains current over time.

In some implementations, security process 110 may generate 304 a requirements report identifying the plurality of security requirements. For instance, after the AI model within security process 110 has determined which standards and controls apply to the project, security process 110 compiles those findings into a structured requirements report. In the continuing example, the developer who uploaded the design artifact can view this report through the example UI 500 in FIG. 5, which summarizes what must be implemented to comply with internal and external security standards. The report lists, for instance, that the project requires automated compliance testing, network security controls, and privileged-access management. Each entry includes explanatory text and a rationale showing which portion of the design triggered the requirement. In contrast to conventional manual documentation or static spreadsheets, this automatically generated report provides an authoritative, machine-readable source of truth that can be shared across development, compliance, and operations teams.

For example in some implementations, security process 110 generates the requirements report as both a human-readable interface and a machine-parsable file. The report-generation module queries the AI inference engine for the list of applicable controls, formats them according to a defined schema (for example, JSON or XML), and enriches each control with metadata such as control ID, related framework references, severity level, and verification method. Security process 110 renders the same data set within the graphical interface shown in FIG. 5, allowing users to approve, disapprove, or drill down into details. Each generated report is digitally time-stamped and stored in a system of record as shown in FIG. 6, establishing traceability for later compliance audits.

This dual-format generation ensures consistency between what developers see in dashboards and what automation scripts consume downstream, eliminating discrepancies that typically occur when requirements are documented separately for humans and machines.

In some implementations, the requirements report is constructed dynamically using a template-based document assembler. Instead of a static schema, the assembler retrieves descriptive text blocks and example code snippets from a component library based on the specific control set identified by the AI model. For example, when encryption requirements are triggered, the assembler automatically inserts a description of acceptable algorithms and links to organizational guidance. As such, security process 110 provides immediate educational context to developers, promoting consistent interpretation of each requirement and reducing the risk of misconfiguration.

A further implementation embeds the generated report directly into a collaborative project-management environment. The report module produces a live data object that synchronizes with ticketing or task systems so that each security requirement appears as an actionable item in the team's backlog. Updates to the report automatically propagate to those tasks whenever the underlying AI inference is retrained or new policies are added. Integrating the report directly into the development workflow eliminates manual copying of requirements and ensures that every team member works from the current, verified set of security obligations.

In some implementations, the requirements report may be formatted for integration with project-management tools to facilitate resource planning and timeline estimation. For instance, after security process 110 generates the requirements report, it may format that report so that it integrates directly with the organization's existing project-management systems. As shown in FIG. 6, the report can be automatically imported into planning and tracking tools used for sprint management or waterfall scheduling. In the ongoing example, once the AI model identifies all required security controls for a new application, security process 110 exports those controls as individual work items or milestones, each tagged with priority, estimated effort, and dependency information. When developers open their project-management dashboard, they see these items merged with their functional development tasks, allowing them to plan resources, timelines, and deliverables in a single environment. This approach ensures that security requirements are treated as core project objectives rather than as separate compliance tasks and that resource planning incorporates the time and effort needed for secure development from the start of the project.

For example, in some implementations, the requirements report is exported using structured data formats such as JSON or CSV that map directly to the import schema of common project-management tools. Each security requirement includes fields for task description, responsible team, estimated effort, and completion criteria. Security process 110 sends this data through an integration API to automatically populate the backlog or schedule view within the organization's planning platform.

In another implementation, the requirements report is formatted using a markup language compatible with agile or DevOps planning frameworks. The report includes metadata tags identifying sprint assignments, dependencies, and risk categories. The project-management system parses these tags to generate timeline projections and capacity forecasts. Tagged, machine-readable formatting allows dynamic synchronization between compliance progress and development planning, producing real-time updates to schedules and resource utilization based on the current state of security verification.

In some implementations, security process 110 links the requirements report to an enterprise resource-planning system that includes cost and staffing modules. Each control requirement is associated with estimated work hours and skill levels, enabling the system to project resource needs and budget implications for secure development. Integrating security planning with financial and staffing forecasts allows management to allocate resources more effectively and justify investments in secure-by-design initiatives through measurable planning data.

In some implementations, security process 110 may populate 306 a development backlog based upon, at least in part, the requirements report. For instance, once the requirements report has been generated, security process 110 automatically converts each listed control into a set of actionable work items that populate a development backlog. In the ongoing example, the developer who reviewed the generated report from FIG. 5 no longer needs to manually copy or interpret the required tasks, and instead, security process 110 pushes these security requirements directly into the organization's project-management tool of security process 110, such as a sprint planning or issue-tracking board, where they appear alongside other development stories. Each item in the backlog includes details such as task priority, risk category, and required verification step. This integration ensures that security is treated as a built-in part of development planning rather than an afterthought near the end of the release cycle, and it provides traceability between design-time security analysis and the actual implementation work performed by the team.

For example, in some implementations, the backlog-population module exposes connectors to standard application programming interfaces used by project-management systems. After the requirements report is finalized, a mapping engine of security process 110 parses each control entry and assigns it to predefined templates (for example, "Add input validation for API endpoints" or "Configure audit logging"). The module uses a representational state transfer (REST) API call to create corresponding backlog items in the team's sprint planning system. Each item is tagged with metadata from the report, such as control ID, compliance framework source, and expected verification method, ensuring that every derived security requirement becomes an actionable and traceable unit of work in the same environment developers already use, promoting accountability and reducing context switching between security and development systems.

In another implementation, the backlog is maintained within the security process itself rather than an external project-management tool. Security process 110 provides a native backlog interface that mirrors the structure of common agile boards but is optimized for security tasks. Developers can link each backlog item to code repositories, track completion status, and automatically mark items as verified when corresponding automated scans in the CI/CD pipeline pass. Advantageously, hosting the backlog internally allows direct correlation between requirement satisfaction and scan results without relying on external integrations, improving synchronization between policy enforcement and code changes.

In some implementations, security process 110 uses an event-driven integration pattern. When the requirements report is approved, security process 110 emits structured messages (for example, JSON payloads over a message queue or webhook). Subscriber services, such as continuous-integration servers or workflow orchestrators, consume these events and generate backlog entries or build tasks automatically. The asynchronous approach decouples the backlog population from any specific project-management product, allowing large enterprises to integrate the process across multiple teams and toolchains while maintaining consistent security governance.

In some implementations, security process 110 may monitor 308 automated build events of the software component in a continuous-integration/continuous-deployment (CI/CD) pipeline. For instance, after the development backlog has been populated with security-aligned work items, security process 110 begins observing the actual coding and build activities that follow. As shown in FIG. 6, the CI/CD pipeline continuously compiles, tests, and deploys the evolving software component. During each of these automated build events, security process 110 listens for changes, triggers, or commits that relate to the previously generated security requirements. In the ongoing example, whenever the developer commits code that satisfies one of the security backlog items, such as enabling encryption or adding authentication logic, security process 110 detects that event and records it for compliance tracking. This replaces the traditional verification step that occurs after a release and instead provides real-time insight into how securely each component is being built. By integrating with the pipeline directly, the security process ensures that compliance evaluation occurs as a natural part of development rather than as a separate audit exercise.

For example, in some implementations, security process 110 subscribes to a message bus or webhook interface exposed by the CI/CD platform. Each time a build event occurs, such as a commit, merge, or test run, the pipeline emits metadata describing the event (e.g., build identifier, artifact hash, test results, and timestamps). The monitoring module of security process 110 parses this metadata and correlates it with the unique application identifier already stored in the system of record. When a build pertains to a security-related change, security process 110 logs the event and triggers automated scans or verification scripts. The monitoring agent runs as a lightweight container alongside the CI/CD orchestration environment to minimize latency and resource consumption. Continuous, event-driven monitoring provides immediate visibility into security-related progress, enabling early detection of non-compliance or misconfigurations before they reach production environments.

In another implementation, the monitoring component integrates through a plug-in architecture rather than a sidecar listener. A plug-in installed in the CI/CD orchestrator invokes an API endpoint of security process 110 at the start and completion of each build. This plug-in collects richer contextual data, including dependency lists, code-coverage metrics, and container configuration details, and sends it as a signed payload. The plug-in model offers tighter coupling and deeper access to build-time data, allowing the AI model to evaluate compliance with fine-grained precision and reduce false positives during subsequent verification steps.

In some implementations, security process 110 employs passive network monitoring. In environments where direct plug-ins are not feasible, security process 110 captures telemetry from build-server network traffic and infers build events by observing artifact uploads, repository fetches, or package distribution signals. The captured data is normalized and fed into the monitoring database. This approach enables secure oversight in highly controlled or third-party-managed environments where direct instrumentation of the CI/CD platform is restricted, maintaining observability without compromising pipeline integrity.

In some implementations, security process 110 may verify 310 compliance of the software component with one or more of the plurality of security requirements based on the automated build events, and in some implementations, verifying compliance may include receiving 318 telemetry from security tools in the CI/CD pipeline and comparing 320 the telemetry against the identified security requirements. For instance, after monitoring the build events, security process 110 evaluates whether those events demonstrate adherence to the previously identified security requirements. In the continuing example, security process 110 receives telemetry data from various security tools embedded within the CI/CD pipeline, such as static code analyzers, dependency vulnerability scanners, and configuration compliance checkers. Each tool emits results as part of the build process, which security process 110 collects and aligns with the relevant requirements stored in the system of record. For example, if one requirement specifies that all external data must be validated, security process 110 cross-checks telemetry from the code scanner to confirm that validation functions exist.

If encryption of stored credentials is required, security process 110 compares build-time secrets management data against that rule. This automated correlation transforms raw testing output into actionable compliance evidence. This continuous verification allows the organization to confirm at every build that controls are being implemented correctly.

For example, in some implementations, the verification logic operates as a telemetry correlation engine within security process 110. During each build, the CI/CD pipeline sends JSON-formatted telemetry packets that contain tool identifiers, scan results, and pass/fail statuses. The correlation engine retrieves the corresponding requirement set for the project and performs rule-based comparisons; for example, matching control identifiers against tool test categories, evaluating numeric thresholds (such as code coverage or severity counts), and computing an overall compliance score. These results are written to a compliance database and surfaced through an interface that displays pass/fail outcomes for each requirement. This creates a near real-time compliance assurance loop, significantly shortening the feedback cycle and reducing human error in interpreting tool results.

In another implementation, verification with security process 110 employs a machine-learning anomaly detector in addition to rule-based checks. Historical telemetry patterns from prior compliant builds are used to train a statistical model that recognizes deviations likely to indicate misconfiguration or regression. Security process 110 flags these anomalies even if individual tool reports appear "clean." For instance, a sudden drop in the number of security tests executed or a missing telemetry source may indicate that a required control has been bypassed. By detecting inconsistencies that static rules might miss, this approach enhances robustness and helps maintain continuous assurance even as the toolchain evolves.

In some implementations, security process 110 introduces federated telemetry aggregation, where each CI/CD environment maintains its own local telemetry collector that performs preliminary correlation before transmitting summaries to a central verification service. The local collector normalizes tool output using a shared schema and transmits only compliance-relevant deltas rather than full logs. This distributed approach reduces network load and improves scalability across large enterprises with multiple CI/CD clusters, while maintaining a consistent compliance-verification methodology enterprise-wide.

In some implementations, security process 110 may update 312 a record for the software component to indicate a compliance status. For instance, in some implementations, the deployment-control logic 800 shown in FIG. 8 (along with FIG. 6) may also be presented to administrators through a visual dashboard that displays component compliance status in real time using red, yellow, and green indicators, once the telemetry from the CI/CD pipeline and associated security tools has been analyzed, security process 110 writes the results into a centralized compliance record that synchronizes with the organization's information-technology service-management (ITSM) platform. Each record represents a living profile for the component, capturing its current compliance score, build history, and the outcome of automated verification events. The record is updated continuously as new telemetry arrives, allowing the deployment-control logic to determine in real time whether the component is fit for release. Security process 110 assigns an intuitive, color-coded compliance status (e.g., red for non-compliant, yellow for "slow lane" partial compliance requiring manual review, and green for full compliance authorizing "fast-lane" deployment). By maintaining this dynamic record within the compliance and ITSM infrastructure, the organization achieves persistent, auditable visibility into every component's security posture across the full software-development lifecycle. In some implementations, security process 110 may classify the compliance state of each software component based on a weighted scoring algorithm that evaluates telemetry received from the CI/CD pipeline. The algorithm may assign a quantitative compliance score by comparing detected control results against severity weights defined in the security requirements. A score above a predetermined "green" threshold indicates full compliance; a score within an intermediate range indicates partial compliance (yellow); and a score below a minimum threshold indicates non-compliance (red). In certain implementations, the color assignment may also consider recent incident data, manual overrides, or time-since-last-verification metrics to provide dynamic, risk-adjusted classification.

For example, in some implementations, security process 110 maintains the compliance record within a relational database linked to the ITSM system. Each verification cycle triggers a transaction that updates fields such as compliance state, score, failed-requirement identifiers, and timestamp. The deployment-control module of security process 110 polls this record before promoting any build to production. When the stored value is green, deployment proceeds automatically through the fast lane; when yellow, the ITSM workflow opens a manual review ticket; and when red, deployment is blocked until remediation tasks close. Real-time synchronization between the compliance record and deployment logic prevents unverified code from reaching production and removes manual steps that traditionally delay release schedules.

In another implementation, the compliance record is implemented as a distributed ledger shared among development, compliance, and operations domains. Each update is written as an immutable transaction containing a cryptographic hash of the verification evidence. The ledger exposes APIs that allow the CI/CD pipeline to query the latest state and enforce gating logic without requiring central-database access. Having immutable, tamper-resistant status tracking provides strong evidentiary assurance for regulatory audits and vendor attestations while maintaining decentralization across teams.

In some implementations, security process 110 employs a document-based data store in which each record is a version-controlled JSON document. The record includes embedded references to telemetry evidence, verification scripts, and approval signatures, and the document's "state" field drives the red/yellow/green visualization, while a background service updates the field whenever new telemetry is processed. The document model simplifies schema evolution and allows asynchronous updates from multiple verification sources, ensuring scalability across thousands of concurrent components.

In some implementations, security process 110 may control 314 deployment of the software component to a production environment based on the compliance status. For instance, as shown in FIG. 8, once the compliance record has been updated, security process 110 uses that information to determine how and whether the software component can proceed into the production environment. Security process 110's deployment-control module interprets the stored compliance status (e.g., red, yellow, or green) and applies the corresponding enforcement action. When the component's status is green, all high-severity security requirements have been verified, allowing the system to automatically approve deployment through a fast-lane path. If the status is yellow, meaning partial compliance or pending review, security process 110 enters a slow-lane path, pausing deployment until manual approval or remediation occurs. A red status halts deployment entirely, blocking promotion to production until the identified deficiencies are corrected and reverified. This mechanism ensures that insecure or unvalidated components are automatically contained before they can expose vulnerabilities in live environments, providing a fully automated "security gate" between development and release.

For example, in some implementations, the deployment-control module of security process 110 operates as a service integrated directly within the CI/CD orchestration platform. Before a release stage executes, the module queries compliance record via an application programming interface (API). The query returns the component's current compliance state and timestamp, and based on this state, security process 110 either (i) triggers an automatic deployment to production (green), (ii) creates a manual-approval request in the ITSM workflow (yellow), or (iii) terminates the pipeline execution and issues an alert (red). Each action is logged back to the system of record for audit purposes. Automating this gate eliminates the need for manual compliance reviews each time prior to release, reduces security risk from human error, and ensures that every deployment aligns with current verification data.

In another implementation, deployment control enforces compliance gating through policy-as-code. The CI/CD pipeline includes a pre-deployment script that reads compliance metadata embedded in the build artifact. This metadata, digitally signed by the security process, contains the compliance status and associated score. The policy engine evaluates this metadata before deployment: if it matches "green," the pipeline continues; if "yellow" or "red," it triggers conditional workflows. Embedding compliance logic directly within the pipeline ensures enforcement even if external systems are offline, increasing reliability and reducing dependency on network availability during deployment.

A further implementation uses container orchestration admission controls (for example, within a Kubernetes-style environment). The admission controller of security process 110 consults compliance record 810 before allowing new workloads to be created. When a component with a "red" status attempts to deploy, the controller rejects the operation; when "yellow," it routes the request to a manual validation queue; and when "green," it automatically admits the workload. This configuration provides enforcement at the infrastructure layer, guaranteeing that only compliant components run in production, even if upstream pipeline checks are bypassed.

In some implementations, security process 110's deployment-control logic of FIG. 8 may also be rendered through a compliance dashboard that provides real-time visibility into release readiness. The dashboard displays color-coded indicators (e.g., red, yellow, green) corresponding to each component's compliance state, as well as details about which requirements are still pending or failed. Administrators can view this dashboard to approve or defer deployments and to track ongoing remediation across multiple projects. Providing a visual dashboard interface allows cross-team stakeholders, such as developers, security engineers, and release managers, to share a unified operational picture, improving communication and accelerating decision-making without compromising automation integrity.

In some implementations, security process 110 may associate 322 the plurality of security requirements with a corresponding unique application identifier. For instance, to ensure that all generated security requirements and verification results are accurately tracked throughout the development and deployment lifecycle, security process 110 links each set of requirements to a unique application identifier. In the continuing example, when a developer begins a new project or uploads a design artifact (as shown in FIG. 5), security process 110 automatically generates an identifier that represents that specific application or service across every phase, from design, through the CI/CD pipeline, and into production monitoring as shown in FIG. 8. All requirements reports, telemetry results, compliance records, and deployment decisions are indexed under this same identifier. This eliminates ambiguity that can arise when multiple teams or microservices share similar names, ensuring that verification evidence and compliance history always relate to the correct component. The association also enables consolidated reporting across the organization, so that risk and compliance trends can be analyzed by application, business unit, or environment.

For example, in some implementations, security process 110 generates a globally unique identifier (GUID) for each new project upon creation of the requirements report. This GUID is stored in the system of record and propagated to all downstream components, including the CI/CD pipeline, ITSM system, and deployment-control module. Each data packet, telemetry report, and audit log entry carries this identifier as a key field, allowing the system to correlate all data back to the originating application. Centralized correlation simplifies compliance aggregation, enables end-to-end traceability, and prevents misattribution of scan results or deployment outcomes across similarly named projects.

In another implementation, the identifier is derived from a cryptographic hash of the application's core attributes, such as project name, repository URL, and environment domain. This ensures that the identifier is deterministic and reproducible even if the system is deployed across multiple distributed environments. The hash function outputs a fixed-length ID that can be embedded in build artifacts and metadata without exposing sensitive details about the project. Using a hash-derived identifier guarantees uniqueness without relying on a central ID registry, making the system more resilient in multi-tenant or cross-organizational deployments.

In some implementations, security process 110 integrates with an organization's existing asset inventory or configuration management database (CMDB), retrieving a pre-assigned application ID from that system whenever a new project is registered. Security process 110 then maps the generated security requirements to that known identifier so that compliance data aligns directly with established IT records, and by leveraging existing asset identifiers maintains data consistency across enterprise governance tools, it avoids duplication of inventory records, allowing compliance data to flow seamlessly into organizational risk dashboards.

In some implementations, security process 110 may update 324 the AI model based on at least one of observed production vulnerabilities and incident data to continuously refine future security requirement generation. For instance, security process 110 forms a closed learning loop in which security process 110 continuously improves its predictive accuracy by analyzing feedback from production environments. Once a component is deployed through the fast- or slow-lane path, security process 110 monitors operational telemetry, vulnerability scans, and incident reports related to that component. If, for example, a vulnerability is detected in a library that had previously passed compliance checks, or an incident response uncovers a control gap, those findings are fed back into the AI model of security process 110. The AI model uses this new data to refine how it interprets design artifacts and to adjust its future security requirement generation. Over time, this adaptive learning ensures that the model evolves alongside emerging threats, organizational policy updates, and real-world performance data, thereby closing the loop between build-time policy enforcement and run-time security intelligence.

For example, in some implementations, the feedback mechanism of security process 110 operates through a model-retraining pipeline integrated with the organization's incident-management and vulnerability-assessment tools. When a verified incident or vulnerability is recorded in the ITSM system, a data-ingestion process extracts relevant features, such as affected control type, root cause, and severity, and adds them to the AI model's training dataset. Retraining occurs on a scheduled cadence (e.g., nightly or weekly) using incremental learning so that only the affected model layers are updated. The updated model is version-controlled and redeployed within the security process 110 environment once validated. Incremental retraining allows security process 110 to remain adaptive to new security patterns while preserving stability and traceability of prior model versions, ensuring continual improvement without service disruption.

In another implementation, real-time feedback is achieved through a streaming ingestion service of security process 110. As production monitoring tools generate new vulnerability or incident events, the data is published to a secure message queue that the AI model subscribes to. The model's inference engine calculates adjustment factors for affected control relationships (for instance, weighting encryption-related controls higher if recurring encryption incidents occur) and stores those adjustments in a reinforcement-learning buffer. Periodically, the buffer is used to update model weights. By streaming feedback, it minimizes the lag between incident detection and model correction, allowing the AI to adapt almost immediately to newly observed threats or weaknesses.

In some implementations, security process 110 employs federated model training, in which production environments in different business units each train local AI instances on their incident data. The resulting model updates are aggregated by security process 110 and merged into a global master model without transferring raw incident data. The global model thus benefits from diverse training inputs while maintaining data privacy and compliance with data-protection regulations. Federated learning enables global intelligence sharing across distributed environments, enhancing model generalization and responsiveness without compromising confidentiality of localized operational data.

In some implementations, security process 110 may transmit 326 non-compliant security requirements to a change-management workflow to trigger additional manual review before deployment. For instance, as discussed above, when the verification results indicate that one or more security requirements have failed or remain unresolved, security process 110 automatically routes those items into a change-management workflow, as shown in FIG. 8. In the ongoing example, this occurs when the component's compliance status is yellow (partial compliance) or red (non-compliance). Rather than blocking deployment silently, security process 110 generates a structured notification that contains details about each failed requirement, the related control family, and supporting telemetry or test evidence. This information is sent to the organization's IT service-management platform or equivalent workflow system, where a ticket is created for manual review by a security analyst or release manager. By integrating non-compliant findings into established change-management processes, the system ensures that human oversight remains part of the decision loop whenever automated verification cannot provide full assurance.

For example, in some implementations, security process 110 uses an API connector to the enterprise's change-management system. Upon detecting a non-compliant requirement, the system compiles a payload that includes the requirement ID, associated compliance status, relevant telemetry summaries, and a recommended remediation action. This payload is transmitted via a secure REST call that automatically opens a change request in the workflow system. The request is linked to the corresponding application identifier so reviewers can trace the issue back to its original requirements report and build history.

In another implementation, non-compliant requirements are sent through a message-queue integration rather than direct API calls. Each failed control generates a standardized JSON message containing the requirement metadata and severity ranking. A queue consumer within the change-management system subscribes to these messages and creates or updates tickets accordingly. This event-driven pattern decouples the two systems, improving scalability and fault tolerance when handling large volumes of concurrent non-compliance events across multiple projects.

In some implementations, security process 110 employs policy-based routing within the CI/CD orchestration platform itself. When a red or yellow status is reported, the pipeline triggers a "pause and review" stage that links directly to the organization's manual-approval portal. Security process 110 provides contextual data and remediation recommendations through a side-panel interface, allowing reviewers to approve, reject, or request re-testing before release. Embedding the manual review gateway directly inside the CI/CD workflow shortens response times and ensures that corrective actions occur in the same operational context as the build and deployment, improving accountability and continuity.

In some implementations, security process 110 may generate 328 a digital certification report confirming compliance of the software component with the plurality of security requirements, wherein the certification report may be digitally signed to authenticate origin and integrity. For instance, after all applicable security requirements have been verified and any non-compliant items have been resolved, security process 110 produces a digital certification report as evidence of compliance, similar in form to the report shown in FIG. 7. This report serves as the formal output of the secure-by-design process, confirming that the software component satisfies all mandatory security controls. In the continuing example, once the component reaches a green compliance state in FIG. 8, security process 110 automatically compiles data from the compliance record, the AI-generated requirements, and the final telemetry results. The certification report lists every control tested, the outcome of each verification, the timestamps of successful checks, and references to underlying evidence stored in the system of record. To ensure authenticity, the report is digitally signed using a private key belonging to the organization's trusted certification authority. This digital signature verifies that the report originated from the authorized security process and has not been altered, allowing it to serve as verifiable proof of compliance for auditors, customers, or regulators.

For example, in some implementations, security process 110 assembles the certification report as a digitally signed PDF or JSON object that consolidates compliance data for the verified software component. Security process 110/ retrieves verified control data, compliance scores, and build identifiers from the compliance record and formats them into a structured document with version metadata and hash values for each evidence artifact. The document is then signed using a cryptographic key managed by the organization's internal public key infrastructure (PKI). Verification of the signature by any third party confirms both the authenticity of the report and the integrity of its contents.

In another implementation, the certification report is created as an XML-based attestation package compatible with automated compliance-validation systems. The package includes machine-readable tags for control identifiers, pass/ fail states, and digital-signature metadata conforming to a standard schema (for example, XML Signature or JSON Web Signature). External systems, such as procurement portals or risk dashboards, can automatically validate the signature and parse the results without human intervention.

In some implementations, security process 110 stores the certification report in a distributed ledger or blockchain registry that serves as a tamper-proof repository for all approved reports. Each certification record is stored as a block containing the report hash, signer identity, and timestamp. Authorized stakeholders can verify compliance status by querying the ledger, eliminating the need to handle or store physical report copies.

In some implementations, security process 110 may store 330 the certification report in an immutable ledger to evidence compliance of the software component with a predefined security profile. For instance, after the certification report has been digitally signed, security process 110 records it within an immutable ledger to create a permanent, tamper-resistant record of compliance. This step ensures that the organization can always produce verifiable proof that the component satisfied all required controls at a particular point in time. When a software component attains a green compliance state, the corresponding certification report is hashed and written as a transaction in the ledger. Each transaction contains the report hash, timestamp, unique application identifier, and digital signature metadata. Because the ledger is append-only, previous reports cannot be altered or deleted, allowing the organization to maintain a trusted historical chain of compliance evidence across all releases. This immutability provides enduring assurance for audits, regulatory reviews, and cross-enterprise certification exchange.

For example, in some implementations, security process 110 maintains a private blockchain ledger within the enterprise environment. Each certification report is converted into a cryptographic hash, and a new block containing the hash, signer identity, and timestamp is appended to the chain. Nodes in the blockchain network validate the new block using a consensus protocol and replicate the updated ledger across multiple secure servers. Authorized users can later verify compliance by comparing a report's hash against the one recorded in the ledger. The blockchain-based ledger prevents tampering or unauthorized modification of certification records, ensuring that compliance evidence remains authentic, verifiable, and permanent.

In another implementation, an immutable ledger is maintained using a cloud-based append-only data store designed for audit trails. The certification report is stored as a signed binary object, and metadata such as version, signer ID, and component identifier are appended as indexed entries.

Access to the ledger is restricted by cryptographic keys and recorded in an audit log to provide full traceability of every read or write operation.

A further implementation integrates with an industry-wide shared ledger operated by multiple trusted entities. Each organization contributes signed compliance reports to a distributed registry accessible through secure APIs. The ledger enforces consensus verification before accepting new entries and supports cross-organization lookups, allowing customers or regulators to confirm a vendor's compliance without requesting proprietary documentation.

In some implementations, security process 110 may update 332 an operational risk score for the software component based on the compliance status. For instance, after compliance verification and certification storage have been completed, security process 110 calculates or updates an operational risk score that reflects the overall security posture of the software component. This scoring operation integrates data from the compliance record, recent build telemetry, and any production incidents detected post-deployment. Each component receives a dynamic score representing its current operational risk within the organization's application portfolio. A component that remains in a green compliance state with no vulnerabilities will carry a low risk score, while one with recurring yellow or red states will accumulate a higher risk value. This score is automatically fed into enterprise dashboards or ITSM analytics to inform resource allocation, patch prioritization, and security governance decisions. By maintaining a continuously updated risk score linked to compliance data, security process 110 allows both developers and management to understand where attention and remediation efforts should be directed.

For example, in some implementations, security process 110 employs a weighted scoring model that assigns numerical values to each compliance factor, such as severity of unresolved requirements, time since last verification, and frequency of incidents. The algorithm computes a composite risk score on a scale (for example, 0 to 100), where lower values represent stronger security posture. The score is updated whenever compliance data changes or new telemetry is received from the CI/CD pipeline or production environment. The score and contributing factors are stored with the application's unique identifier for traceability. The weighted model translates complex compliance metrics into a single actionable figure, enabling quantitative comparison of security posture across projects and simplifying executive-level risk reporting.

In another implementation, the operational risk score is derived from a probabilistic model that predicts the likelihood of a future security incident based on historical compliance behavior. The model uses regression or Bayesian inference over variables such as previous audit failures, frequency of yellow-state occurrences, and mean time to remediate. The predicted probability is then scaled into a normalized risk index. This predictive method converts compliance history into forward-looking insights, allowing the organization to anticipate and mitigate potential vulnerabilities before they result in incidents.

A further implementation uses an adaptive scoring engine that continuously recalibrates weightings based on enterprise-level threat intelligence. If a particular type of control failure becomes associated with higher real-world breach rates, its weight automatically increases in subsequent calculations. The adaptive engine uses data feeds from incident databases, vulnerability advisories, and external threat sources to keep risk computation current. Adaptive scoring ensures that operational risk reflects the true threat landscape rather than static policy weightings, allowing the organization to maintain a more accurate and responsive risk-management framework.

In some implementations, security process 110 may enforce 334 a speed-lane deployment control based on whether the compliance status transitions to a red, a yellow, or a green state. For instance, as discussed above, following the continuous compliance and risk evaluation process, security process 110 applies a dynamic deployment-control mechanism, referred to as the speed-lane control, as depicted in FIG. 8. This mechanism determines how quickly or through what process a software component may progress toward release based on its current compliance status. In the continuing example, when the component's compliance record reflects a green state, the deployment-control module of security process 110 automatically routes it to the fast lane, authorizing immediate or automated promotion to production. A yellow state places the component in a slow lane, where additional review, manual testing, or sign-off is required. If the compliance state becomes red, deployment is halted entirely, and a change-management request is issued for remediation before any further progression. This automated enforcement ensures that the release velocity of each component is proportional to its verified security quality, reducing operational risk without impeding compliant teams from deploying efficiently.

For example, in some implementations, the speed-lane deployment control is implemented as a conditional stage within the CI/CD orchestration pipeline. The pipeline queries the compliance record before initiating deployment and retrieves the most recent color state. If green, deployment proceeds automatically to the production environment; if yellow, the pipeline pauses and notifies reviewers through the ITSM interface; if red, the pipeline terminates execution and logs the failure event. Transitions between color states trigger notifications to development teams and update the audit log stored within the system of record. This implementation embeds security gating directly within existing CI/CD workflows, creating a self-regulating process that enforces security policy at the same speed and precision as code deployment.

In another implementation, the speed-lane logic operates through a rules engine external to the CI/CD platform. The engine evaluates compliance status and risk scores from multiple projects, prioritizing deployment queues based on security maturity. For example, projects maintaining a consistently green status are assigned higher pipeline bandwidth and shorter approval cycles, while those with frequent yellow or red states experience enforced cool-down periods before redeployment. A centralized orchestration of deployment speed across multiple pipelines provides enterprise-wide optimization of release velocity and security assurance, ensuring resources are allocated to teams demonstrating consistent compliance.

In some implementations, security process 110 introduces a machine-learning policy that predicts the appropriate lane based on historical compliance transitions and incident outcomes. The model refines thresholds for lane assignment dynamically, tightening or relaxing gating sensitivity depending on observed post-deployment results. For instance, if a component that passed as green later generates incidents, the model automatically adjusts its decision parameters to raise the standard for future deployments. Adaptive gating creates a self-correcting deployment environment that continuously aligns enforcement strictness with actual operational outcomes, maintaining both agility and security resilience.

In some implementations, security process 110 may, via the AI model, generate 336 a threat model predicting potential attack vectors based on the application development data, and in some implementations, security process 110 may update 338 the threat model dynamically using real-time cyber-threat intelligence feeds to modify a risk ranking of the software component. For instance, building upon its ability to define and enforce security requirements, security process 110 also generates and continuously refines a dynamic threat model that forecasts how an application could be targeted by evolving attack methods. As shown conceptually in FIG. 8, the same AI model that interprets design artifacts for compliance generation can produce a predictive mapping of potential attack vectors, such as injection, privilege escalation, or data exfiltration, based on the structure and function of the software component. Once the initial threat model is created, security process 110 continuously updates it using real-time cyber-threat intelligence feeds from external and internal sources. In the example, security process 110 receives intelligence about emerging exploits, malware campaigns, and newly discovered vulnerabilities in third-party components. The AI model correlates this data with the application's architecture and dependencies, recalculating a risk ranking that reflects both the static design and the current threat landscape. This dynamic update capability enables security teams to prioritize remediation efforts and deployment decisions according to the most relevant and immediate risks.

For example, in some implementations, the threat model is built using a rule-based inference engine layered over the AI model's design analysis output. Each design element, such as exposed interfaces, authentication flows, and data-handling operations, is evaluated against a library of threat patterns curated from vulnerability databases and internal incident records. As new threat intelligence is received through structured feeds (for example, STIX or TAXII formats), security process 110 compares those threat signatures with known architectural patterns. When a match or correlation is found, the AI model updates the associated threat likelihoods and adjusts the component's overall risk score. Combining static design intelligence with live threat feeds transforms the threat model from a one-time assessment into a continuously evolving prediction tool, keeping the application's risk posture aligned with real-world adversary activity.

In another implementation, security process 110 represents each application as a multi-layer graph where nodes correspond to components and edges define trust boundaries or data flows. The AI model uses probabilistic reasoning to estimate the likelihood of attack success along each path. Real-time threat intelligence updates the weighting of nodes or edges dynamically, for instance, increasing the likelihood score of an exposed API when a new exploit affecting similar APIs is reported. The resulting threat model continuously recalculates risk rankings and feeds those rankings into the operational risk score described earlier. The graph-based probabilistic approach captures relationships between system components and integrates external threat activity directly into those relationships, improving situational awareness and predictive depth.

In some implementations, security process 110 employs a reinforcement-learning architecture where the AI model periodically retrains on confirmed incident outcomes. When threat intelligence predicts a high-risk vector and subsequent incidents validate that prediction, the model increases its confidence weighting for similar vectors in future analyses. Conversely, predictions that do not materialize lead to weight reductions, creating a self-tuning system that improves accuracy over time. This adaptive learning feedback loop refines threat-model precision, reducing false positives and ensuring that the risk rankings generated by security process 110 remain both current and empirically grounded.

In some implementations, the AI model may be deployed as a third-party certification service accessible to multiple independent software vendors and configured to enforce generation of security-requirement reports prior to production deployment. For instance, the functionality of security process 110 may be offered as an external certification service rather than an internal enterprise tool. This deployment enables multiple independent software vendors to access the AI model through a secure web interface or application programming interface (API) for automated compliance assessment. For example, a vendor preparing to release an application uploads its design artifacts or build metadata to the certification service before production deployment. The AI model analyzes the submission, generates a security-requirement report, and verifies the application's compliance with recognized frameworks and organizational security policies. Only after the certification service confirms compliance and issues a digitally signed report does the vendor's software proceed to release. This configuration establishes a standardized, vendor-neutral mechanism for demonstrating adherence to security requirements across diverse organizations, eliminating the inconsistencies of manual security attestations.

For example, in some implementations, the certification service of security process 110 is hosted within a secure cloud infrastructure managed by an independent certifying entity. Vendors authenticate to the service through an API gateway, providing metadata such as application type, deployment environment, and data classification. The AI model executes the same analyses used internally, requirement generation, threat modeling, and compliance verification, and produces a signed certification report. The service maintains an immutable record of all certified artifacts, enabling customers or regulators to verify compliance by referencing the corresponding report identifier. Providing the AI model as a hosted certification service standardizes compliance validation, streamlines vendor onboarding, and enables organizations to trust third-party software without requiring access to proprietary source code or internal scans.

In another implementation, the certification service is integrated directly into software distribution platforms. When a vendor attempts to publish or update an application, the distribution platform automatically invokes the certification API to ensure that a valid, signed compliance report exists for that version. If the report is missing or outdated, the platform rejects the release until a new assessment is completed. Embedding the certification workflow within release and distribution systems enforces security validation as a prerequisite to publication, preventing non-compliant or high-risk applications from entering customer environments.

In some implementations, security process 110 allows the AI model to operate in a federated architecture, where multiple organizations host local certification nodes that synchronize compliance data with a shared ledger. Each node uses the same AI inference model but maintains autonomy over its internal control libraries. Certified reports are logged into a common distributed registry that customers can query for verification. Federated certification promotes interoperability and decentralized trust, allowing enterprises, vendors, and regulatory bodies to rely on a common AI-driven framework for verifying software security without disclosing confidential details.

In some implementations, security process 110 may automatically update 340 a configuration of the CI/CD pipeline to include enforcement scripts for the plurality of security requirements. For instance, after generating and formatting the requirements report, security process 110 can automatically configure the continuous integration and continuous deployment (CI/CD) pipeline so that it enforces the identified security controls without additional manual setup. As shown in FIG. 8, this allows security verification to become an intrinsic part of every build and deployment cycle. In the continued example, once the AI model identifies which requirements apply, such as secure coding standards, dependency checks, encryption configuration, or secret management policies, security process 110 injects or activates enforcement scripts directly within the organization's CI/CD configuration files. These scripts execute during build and deployment events to validate compliance automatically. For example, a newly required control might prompt the system to insert a code-scanning step or a policy check into the pipeline's workflow definition. By doing this dynamically, security process 110 ensures that new or updated controls are immediately reflected in the software delivery process, eliminating the delays and errors common to manual configuration.

For example, in some implementations, security process 110 connects to the CI/CD platform's configuration repository (for example, YAML, JSON, or Groovy-based workflow files) and programmatically inserts enforcement directives aligned with the current set of active security requirements. Each directive references an enforcement script, such as a static analysis tool, dependency scanner, or configuration validator, hosted within a centralized library maintained by the organization. The updated configuration is committed back to version control with a digital signature, ensuring traceability and rollback capability. Automatically injecting enforcement steps keeps the CI/CD pipeline continuously aligned with the latest security policies, reducing administrative overhead and ensuring that no build can bypass newly defined security controls.

In another implementation, the CI/CD configuration is updated through an orchestration API rather than by modifying workflow files directly. Security process 110 communicates with the pipeline's orchestration engine to register new enforcement jobs or modify existing build stages. When the AI model determines that a new requirement applies, the system issues API calls to insert or update relevant stages in the active pipeline configuration. API-based orchestration enables centralized control across multiple pipelines and provides immediate deployment of updated security checks without requiring manual edits to configuration repositories.

In some implementations, security process 110 uses a policy-as-code framework that treats security requirements as executable policy definitions. Security process 110 converts each applicable requirement into a policy rule and stores it within the pipeline's policy engine, and when code changes or deployment events occur, the policy engine evaluates these rules automatically to determine compliance. Advantageously, expressing security controls as code ensures consistent enforcement across heterogeneous environments and enables version-controlled governance of security automation policies.

The terminology used herein is for the purpose of describing particular implementations only and is not intended to be limiting of the disclosure. As used herein, the singular forms "a", "an" and "the" are intended to include the plural forms as well, including any steps performed by a/the computer/ processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/ or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "communicating," "receiving," "connected," "engaged," "adjacent," "next to," "on top of," "above," "below," "abutting," and "disposed," used herein is to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner. The term "set" does not necessarily exclude the empty set—in other words, in some circumstances a "set" may have zero elements. The term "non-empty set" may be used to indicate exclusion of the empty set—that is, a non-empty set must have one or more elements, but this term need not be specifically used. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The corresponding structures, materials, acts, and equivalents (e.g., of all means or step plus function elements) that may be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure. Moreover, although this disclosure describes and depicts respective implementations herein as including particular components, elements, feature, functions, operations, or steps (and arrangements thereof), any of these implementations may include any combination, arrangement, or permutation of any of the components, elements, features, functions, operations, or steps described or depicted anywhere herein that a person having ordinary skill in the art would comprehend after reading the present disclosure. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, comprising:

receiving, by a computing system, application development data describing at least one software component to be developed;

identifying, by an artificial intelligence (AI) model trained with industry-standard security frameworks and organization-specific security policies, a plurality of security requirements corresponding to the application development data;

generating a requirements report identifying the plurality of security requirements;

populating a development backlog based upon, at least in part, the requirements report;

monitoring automated build events of the software component in a continuous-integration/continuous-deployment (CI/CD) pipeline;

verifying compliance of the software component with one or more of the plurality of security requirements based on the automated build events;

updating a record for the software component to indicate a compliance status;

controlling deployment of the software component to a production environment based on the compliance status; and updating the AI model based on at least one of observed production vulnerabilities and incident data to continuously refine future security requirement generation of the plurality of security requirements for the at least one software component.

2. The method of claim 1, wherein the AI model is trained using non-functional security requirements from at least one of NIST, PCI-DSS, ISO-27001, and OWASP, in combination with internal organizational standards.

3. The method of claim 1, wherein receiving the application development data includes ingesting a design artifact describing an intended functionality of the software component.

4. The method of claim 1, wherein the AI model performs natural-language processing to extract contextual indicators of technology stack, hosting environment, and data classification to determine relevant security controls.

5. The method of claim 1, further comprising associating the plurality of security requirements with a corresponding unique application identifier.

6. The method of claim 1, wherein verifying compliance includes:

receiving telemetry from security tools in the CI/CD pipeline; and comparing the telemetry against the identified security requirements.

7. The method of claim 6, wherein the compliance status is represented using a color-coded indicator comprising a red, yellow, or green state.

8. The method of claim 1, further comprising transmitting non-compliant security requirements to a change-management workflow to trigger additional manual review before deployment.

9. The method of claim 1, further comprising generating a digital certification report confirming compliance of the software component with the plurality of security requirements, wherein the certification report is digitally signed to authenticate origin and integrity.

10. The method of claim 9, further comprising storing the certification report in an immutable ledger to evidence compliance of the software component with a predefined security profile.

11. The method of claim 1, further comprising updating an operational risk score for the software component based on the compliance status.

12. The method of claim 1, further comprising enforcing a speed-lane deployment control based on whether the compliance status transitions to a red, a yellow, or a green state.

13. The method of claim 1, further comprising generating, by the AI model, a threat model predicting potential attack vectors based on the application development data.

14. The method of claim 13, further comprising updating the threat model dynamically using real-time cyber-threat intelligence feeds to modify a risk ranking of the software component.

15. The method of claim 1, wherein the requirements report is formatted for integration with project-management tools to facilitate resource planning and timeline estimation.

16. The method of claim 1, further comprising automatically updating a configuration of the CI/CD pipeline to include enforcement scripts for the plurality of security requirements.

17. The method of claim 1, wherein the AI model is deployed as a third-party certification service accessible to multiple independent software vendors and configured to enforce generation of security-requirement reports prior to production deployment.

18. A computer program product residing on a computer readable storage medium having a plurality of instructions stored thereon which, when executed across one or more processors, causes at least a portion of the one or more processors to perform operations comprising:

receiving, by a computing system, application development data describing at least one software component to be developed;

identifying, by an artificial intelligence (AI) model trained with industry-standard security frameworks and organization-specific security policies, a plurality of security requirements corresponding to the application development data;

generating a requirements report identifying the plurality of security requirements;

populating a development backlog based upon, at least in part, the requirements report;

monitoring automated build events of the software component in a continuous-integration/continuous-deployment (CI/CD) pipeline;

verifying compliance of the software component with one or more of the plurality of security requirements based on the automated build events;

updating a record for the software component to indicate a compliance status;

controlling deployment of the software component to a production environment based on the compliance status; and updating the AI model based on at least one of observed production vulnerabilities and incident data to continuously refine future security requirement generation of the plurality of security requirements for the at least one software component.

19. A computing system including one or more processors and one or more memories configured to perform operations comprising:

receiving, by a computing system, application development data describing at least one software component to be developed;

identifying, by an artificial intelligence (AI) model trained with industry-standard security frameworks and organization-specific security policies, a plurality of security requirements corresponding to the application development data;

generating a requirements report identifying the plurality of security requirements;

populating a development backlog based upon, at least in part, the requirements report;

monitoring automated build events of the software component in a continuous-integration/continuous-deployment (CI/CD) pipeline;

verifying compliance of the software component with one or more of the plurality of security requirements based on the automated build events;

updating a record for the software component to indicate a compliance status;

controlling deployment of the software component to a
production environment based on the compliance sta-
tus; and
updating the AI model based on at least one of observed
production vulnerabilities and incident data to continuously refine future security requirement generation of
the plurality of security requirements for the at least
one software component.

\* \* \* \* \*